US012558763B2

(12) United States Patent
Frenken

(10) Patent No.: US 12,558,763 B2
(45) Date of Patent: Feb. 24, 2026

(54) WORKING DEVICE HAVING A HYDRAULIC CYLINDER AND MANUAL WORKING DEVICE SUCH AS A PLIERS OR A PRESS

(71) Applicant: GUSTAV KLAUKE GMBH, Remscheid (DE)

(72) Inventor: Egbert Frenken, Heinsberg (DE)

(73) Assignee: GUSTAV KLAUKE GMBH (DE)

( * ) Notice: Subject to any disclaimer, the term of this patent is extended or adjusted under 35 U.S.C. 154(b) by 0 days.

(21) Appl. No.: 18/428,237

(22) Filed: Jan. 31, 2024

(65) Prior Publication Data

US 2024/0173829 A1 May 30, 2024

Related U.S. Application Data

(62) Division of application No. 17/056,712, filed as application No. PCT/EP2019/062635 on May 16, 2019, now Pat. No. 11,919,131.

(30) Foreign Application Priority Data

May 18, 2018 (DE) ...................... 10 2018 112 097.4
Jun. 20, 2018 (DE) ...................... 10 2018 114 844.5
(Continued)

(51) Int. Cl.
*B25B 27/10* (2006.01)
*B25F 5/00* (2006.01)
*F16J 15/16* (2006.01)

(52) U.S. Cl.
CPC .............. *B25B 27/10* (2013.01); *B25F 5/005* (2013.01); *F16J 15/164* (2013.01)

(58) Field of Classification Search
CPC ....... B25B 27/10; B25B 27/026; B25F 5/005; F16J 15/164; H01R 43/0427; H01R 43/0428; H01R 43/0421
See application file for complete search history.

(56) References Cited

U.S. PATENT DOCUMENTS 4,256,187 A * 3/1981 Barnard ................... B25D 9/12
173/202
4,292,833 A * 10/1981 Lapp ........................ H02G 1/00
72/416
(Continued)

FOREIGN PATENT DOCUMENTS

DE 19525251 A1 1/1996
DE 20218307 U1 4/2003
(Continued)

OTHER PUBLICATIONS

International Search Report for International Patent Application No. PCT/EP2019/062635 mailed Jan. 8, 2020, 7 pages.
(Continued)

*Primary Examiner* — Dariush Seif
(74) *Attorney, Agent, or Firm* — Klintworth & Rozenblat LLP

(57) ABSTRACT

A hydraulically actuated working device having a hydraulic cylinder, a hydraulic piston that can be displaced in the hydraulic cylinder, a drive unit part which has a motor and a pump, and a hydraulic line leading to the hydraulic cylinder. The drive unit part is designed in an electrically insulating manner, to provide an electrically insulating separating layer, which passes through the working device in a crossing manner for electrical separation from the working device part with respect to an end of the hydraulic piston facing the drive unit part. The hydraulic line is guided through the separating layer, thereby also forming a partial region of the hydraulic line made of an electrically insulating material.

21 Claims, 19 Drawing Sheets

(30) Foreign Application Priority Data

| | | |
|---|---|---|
| Aug. 1, 2018 | (DE) | ...................... 10 2018 118 678.9 |
| Feb. 19, 2019 | (DE) | ...................... 10 2019 104 150.3 |

(56) References Cited

U.S. PATENT DOCUMENTS

| | | | | |
|---|---|---|---|---|
| 4,942,757 | A * | 7/1990 | Pecora | H01R 43/0427 72/416 |
| 4,948,105 | A * | 8/1990 | Yonezawa | B29C 33/305 269/309 |
| 5,150,644 | A * | 9/1992 | Kimura | B25F 5/005 91/410 |
| 5,381,686 | A * | 1/1995 | Thorup | H01R 43/0427 72/453.06 |
| 5,421,186 | A * | 6/1995 | Lefavour | H01R 43/042 72/409.14 |
| 5,659,214 | A * | 8/1997 | Guardiani | F04D 7/045 310/90 |
| 6,230,542 | B1 * | 5/2001 | Frenken | B25B 27/10 30/228 |
| 6,718,870 | B1 * | 4/2004 | Frenken | B25B 27/146 100/231 |
| 7,254,982 | B2 | 8/2007 | Frenken | |
| 8,056,473 | B2 * | 11/2011 | Frenken | B25B 27/10 100/35 |
| 9,573,335 | B2 * | 2/2017 | Schweizer | B23B 31/1071 |
| 9,731,411 | B2 * | 8/2017 | Uchiyama | F16K 15/18 |
| 9,950,411 | B1 * | 4/2018 | Clover | B25B 13/481 |
| 10,000,007 | B2 * | 6/2018 | Dickert | B29C 57/04 |
| 10,093,012 | B2 * | 10/2018 | Koski | H01R 43/048 |
| 10,646,983 | B2 * | 5/2020 | Barezzani | B23D 29/002 |
| 10,819,077 | B2 * | 10/2020 | Chawgo | H01R 43/0427 |
| 12,172,289 | B2 * | 12/2024 | Littwin | H01M 50/287 |
| 2001/0003317 | A1 * | 6/2001 | Klemm | F16H 61/44 173/222 |
| 2001/0007202 | A1 * | 7/2001 | Frenken | B23D 29/00 72/416 |
| 2003/0188566 | A1 * | 10/2003 | Lefavour | B25B 27/10 72/453.16 |
| 2003/0196472 | A1 * | 10/2003 | LeFavour | B25B 27/10 72/455 |
| 2005/0120770 | A1 * | 6/2005 | Frenken | B25F 5/02 72/453.16 |
| 2005/0195054 | A1 * | 9/2005 | Jackson | H01R 13/53 335/16 |
| 2008/0235913 | A1 * | 10/2008 | Eicher | B25F 5/026 173/162.2 |
| 2009/0008118 | A1 * | 1/2009 | Frenken | H01R 43/0427 173/221 |
| 2009/0188692 | A1 * | 7/2009 | Hahn | B25D 17/24 173/210 |
| 2010/0000288 | A1 * | 1/2010 | Barezzani | B25B 27/146 74/25 |
| 2011/0215539 | A1 * | 9/2011 | Van Der Linde | B25B 33/005 279/147 |
| 2012/0160065 | A1 * | 6/2012 | Frenken | B21J 15/20 81/57.44 |
| 2012/0299249 | A1 * | 11/2012 | Okamura | F16J 15/064 277/549 |
| 2013/0263447 | A1 * | 10/2013 | Adcock | H01R 4/70 29/869 |
| 2014/0259664 | A1 * | 9/2014 | McAlister | F16J 10/04 29/888.061 |
| 2014/0352793 | A1 * | 12/2014 | Martin | H01R 13/5202 137/14 |
| 2015/0283693 | A1 * | 10/2015 | Chiasson | B25F 5/005 173/168 |
| 2015/0345519 | A1 * | 12/2015 | Vetrovec | H02K 44/00 60/326 |
| 2015/0364889 | A1 * | 12/2015 | Frenken | H01R 43/0427 29/862 |
| 2016/0257390 | A1 * | 9/2016 | Tsutsui | C23F 13/06 |
| 2016/0363510 | A1 * | 12/2016 | Kanack | B25B 27/10 |
| 2016/0368128 | A1 * | 12/2016 | Uchiyama | F16K 17/048 |
| 2017/0317461 | A1 * | 11/2017 | Wason | B25B 27/10 |
| 2018/0319000 | A1 * | 11/2018 | Frenken | F15B 15/22 |
| 2018/0326600 | A1 * | 11/2018 | Wason | B26B 15/00 |
| 2018/0361561 | A1 * | 12/2018 | Frenken | A41D 1/002 |
| 2019/0240826 | A1 * | 8/2019 | Frenken | B25B 27/10 |
| 2019/0308255 | A1 * | 10/2019 | Wason | B26B 15/00 |
| 2020/0059058 | A1 * | 2/2020 | Wason | B21D 39/048 |
| 2020/0298388 | A1 * | 9/2020 | Norquist | B25F 5/02 |
| 2021/0205975 | A1 * | 7/2021 | Frenken | H02G 1/005 |
| 2025/0296137 | A1 * | 9/2025 | Bobowicz | B25B 27/10 |

FOREIGN PATENT DOCUMENTS

| | | |
|---|---|---|
| DE | 10326066 A1 | 1/2005 |
| EP | 1084798 A2 | 3/2001 |
| EP | 2461037 A1 | 6/2012 |
| WO | 03/064091 A1 | 8/2003 |
| WO | 03/084719 A2 | 10/2003 |
| WO | 2008/138987 A2 | 11/2008 |
| WO | 2014/108361 A1 | 7/2014 |
| WO | 2016/112153 A2 | 7/2016 |
| WO | 2018/065513 A1 | 4/2018 |

OTHER PUBLICATIONS

International Preliminary Report on Patentability for International Patent Application No. PCT/EP2019/062635 mailed Oct. 28, 2020, 17 pages.

Written Notification from Authority Responsible for the International Preliminary Examination for International Patent Application No. PCT/EP2019/062635 mailed Jul. 17, 2020, 15 pages.

Written Notice from the International Research Agency for International Patent Application No. PCT/EP2019/062635 mailed Jul. 17, 2020, 15 pages.

Machine translation of DE 10326066 A1.

Machine translation of DE 19525251 A1.

Machine translation of DE 20218307 U1.

Machine translation of EP 2461037 A1.

Machine translation of WO 03064091 A1.

* cited by examiner

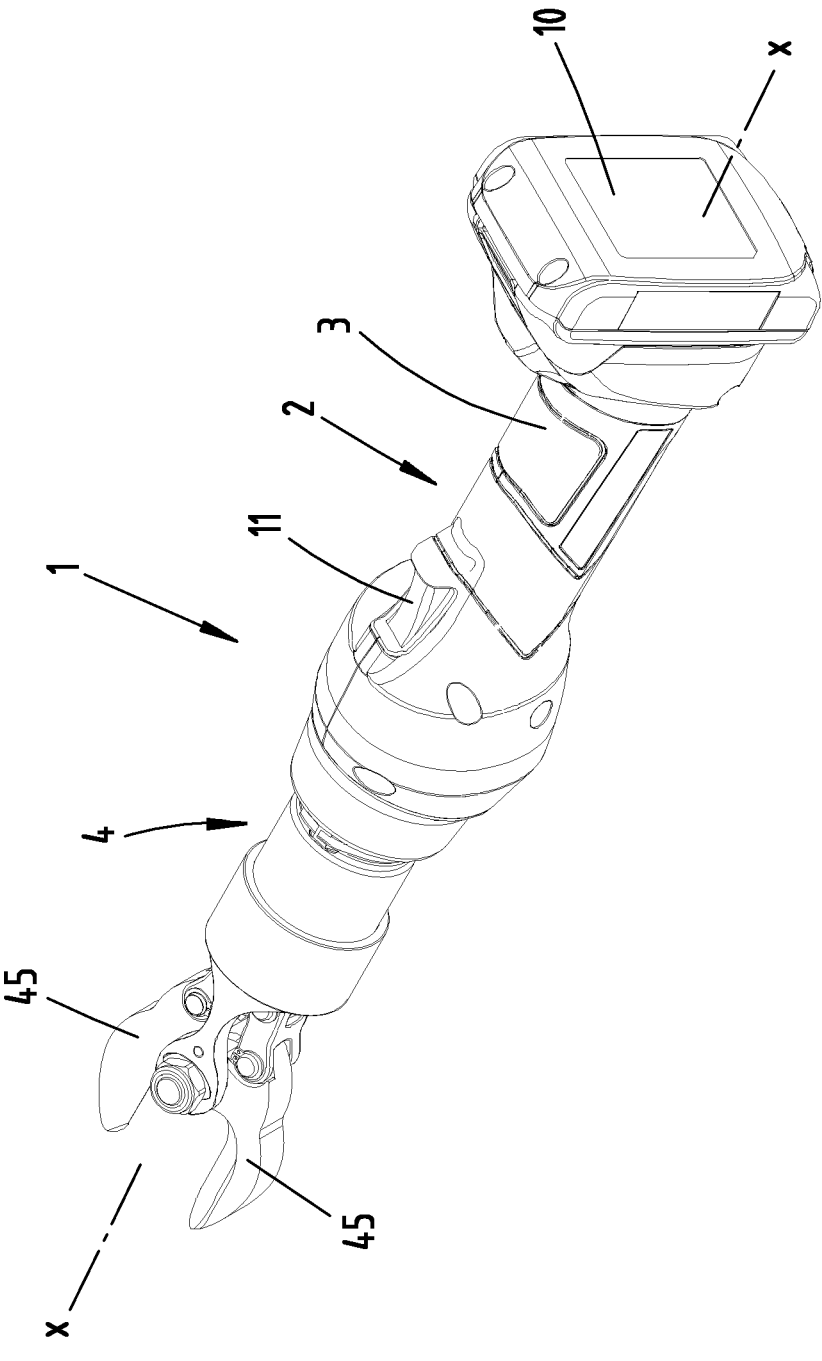

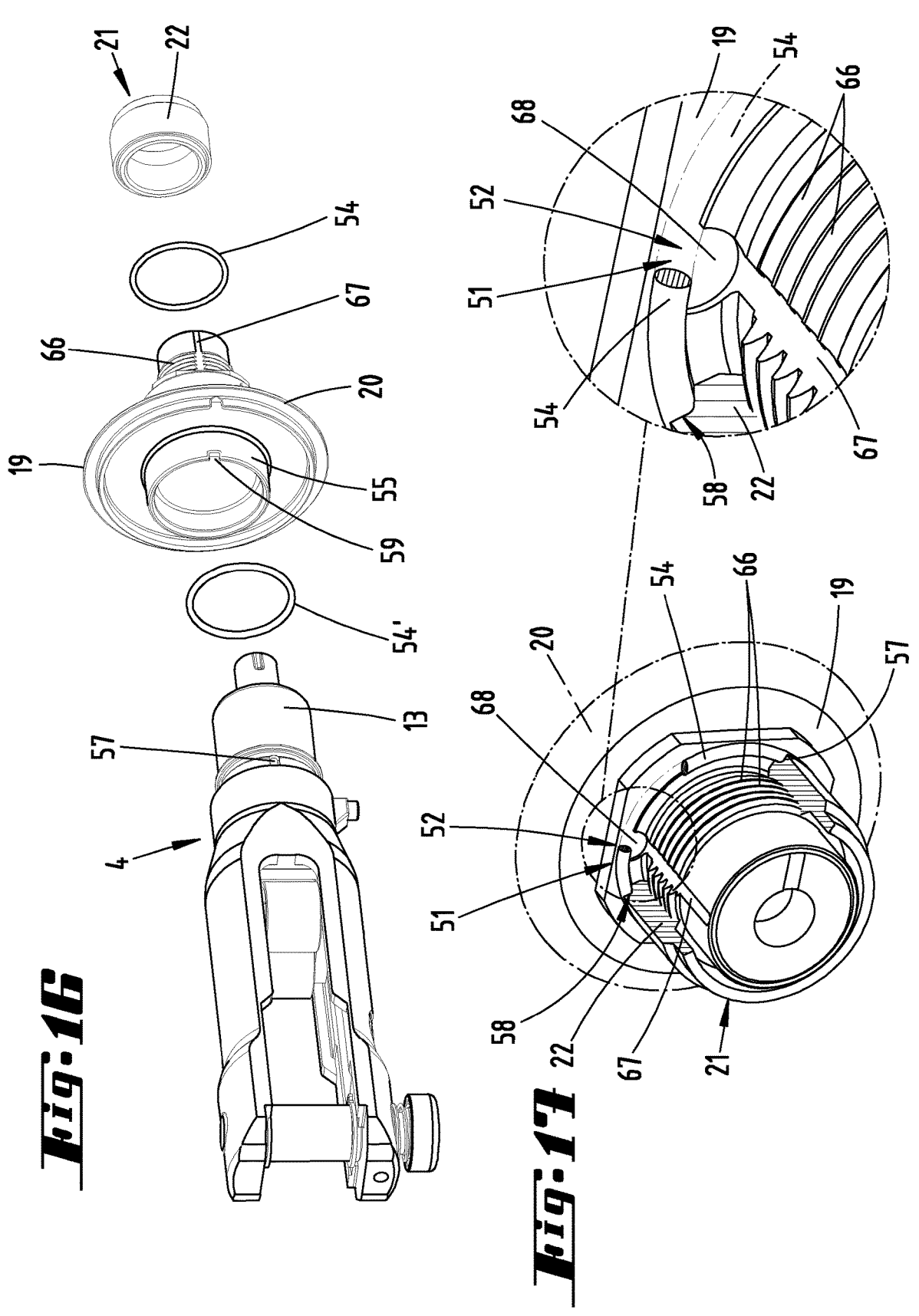
*Fig·16*
*Fig·17*

WORKING DEVICE HAVING A HYDRAULIC CYLINDER AND MANUAL WORKING DEVICE SUCH AS A PLIERS OR A PRESS

CROSS REFERENCE TO PRIOR APPLICATION

This application claims priority to U.S. application Ser. No. 17/056,712 filed Mar. 16, 2021 which is a 371 of International Patent Application No. PCT/EP2019/062635 filed May 16, 2019, and which claims priority to German Patent Application Nos. DE 102018112097.4 filed May 18, 2018, DE 102018114844.5 filed Jun. 20, 2018, DE 102018118678.9 filed Aug. 1, 2018 and DE 102019104150.3 filed Feb. 19, 2019, the contents of which are incorporated herein in their entirety.

FIELD OF TECHNOLOGY

The invention initially relates to a hydraulically actuated working device having a hydraulic cylinder, a hydraulic piston, which can be displaced in the hydraulic cylinder, a drive device part, which has a motor and a pump, and a hydraulic line leading to the hydraulic cylinder.

The invention also relates to a manual working device, preferably a hydraulically actuated working device.

In addition, the invention relates to an assembly for sealing an intermediate space between two parts against ingress of a medium from the outside to the inside.

A working device having a hydraulic cylinder and hydraulic piston displaceable therein, which is formed with an extension part for reaching more distant work positions, is known from US 2015/283693 A1. For this purpose, a first and a second hydraulic cylinder is provided, wherein the hydraulic medium line between the first and the second hydraulic cylinder can be formed as hydraulic hose consisting of non-conductive material.

A working device having a hydraulic piston is known from EP 2461037, wherein a safety connection hose, which transfers the hydraulic medium to a cable cutting head or a hydraulic jack, can be connected to the hydraulic piston.

With respect to the assembly for sealing an intermediate space between two parts against an ingress of a medium from the outside to the inside, an assembly is known from US 2012/299249 A1, in the case of which hydraulic medium can escape from the seal to the outside at an unpredictable point viewed over the circumference, in the case of corresponding higher pressure from the inside.

PRIOR ART

Working devices of the type in question are known, for example, as accumulator-operated manual working devices, in the case of which a work process is triggered as a result of an impulses, for example as a result of the actuation of a trigger button, at the working device, in particular at a drive device part.

Devices of this type are, for example, not exclusively, accumulator-operated pressing, punching, crimping, or cutting devices, as they are further known, for example, from WO 2003/084719 A2 (U.S. Pat. No. 7,254,982 B2) or from EP 1 084 798 A2 (U.S. Pat. No. 6,718,870 B1), or from EP 1 155 077 B1, or from WO 2008/138987 A2 (U.S. Pat. No. 8,056,473 B2), or from WO 2014/108361 A1 (US 2015/0364889 A1). The device parts described in the mentioned publications also belong to the disclosure of the present application, provided that they are not modified separately in the case at hand, as additionally described below.

In this context and also in addition, assemblies for sealing an intermediate space between two parts have furthermore become known, which prevent in particular an ingress of a medium, such as, for example water, from the outside to the inside.

SUMMARY OF THE INVENTION

It is the object of the present invention to further improve a working device of the type in question, in particular in terms of safety. A further object of the invention is to form an assembly for the seal of the type in question in an advantageously improved manner.

This object is initially solved in the case of the working device, the focus is on that the hydraulic cylinder is formed in an electrically insulated manner with respect to the drive device part, for which purpose an electrically insulating separating layer is provided, which passes through the working device in a crossing manner for the electrical separation from the working device part in the region of an end of the hydraulic cylinder facing the drive device part, wherein the hydraulic line is guided through the separating layer while also forming a partial region of the hydraulic line made of an electrically insulating material.

According to a further idea of the invention, which can be realized as an alternative to or in combination with the above-described concept, the hydraulic cylinder can be formed in an electrically insulating manner, wherein an electrically insulating piston head is provided with respect to the hydraulic piston, and/or the hydraulic piston can only be displaced so far in the direction of the drive device part that a largest distance between a point of the piston head and an electrically conductive region of the drive device part exceeds a distance, which is necessary for the electrical insulation.

According to a further idea of the invention, it can also be provided as an alternative to or in combination with the above-described concepts that the hydraulic cylinder is formed in an electrically insulated manner with respect to the drive device part, for which purpose an electrically insulating separating layer is preferably provided, which passes through the working device in a crossing manner for the electrical separation from the working device part in the region of an end of the hydraulic cylinder facing the drive device part, and wherein the hydraulic line extends as hydraulic hose between a hydraulic medium pump in a handle region of the working device and the hydraulic cylinder.

According to a further idea of the invention, it can further be provided as an alternative to or also in combination with the above-described concepts in the case of a working device, wherein the working device has a handle region and a working head, which is separate from the handle region, that the handle region is separate from the working head by means of a radial collar, which consists of electrically non-conductive material and which protrudes radially over the handle region, or which is separate from the working head by means of a tapering region, which adjoins the handle region on a working head side and which extends axially, wherein a radial level of protrusion and an axial level of extension of the tapering region is as thick as a finger or more, and the tapering region is limited on one end by the drive device part and axially on the other end by an electrically conductive radial section of a wall section of the working head, or the radial collar.

In addition, it can further also be provided as an alternative to or in combination with the above-described concepts that a seal with respect to ingress of a fluid from the outside into the hydraulically actuated working device is formed in a joining region of the hydraulic cylinder, and that with respect to a hydraulic medium pressure, which is possible in the joining region and develops from the inside, a relief valve for discharging hydraulic medium to the outside is provided.

The proposed seal in the joining region of the hydraulic cylinder can, and preferably, provide a protection against the ingress of a fluid from the outside to the inside. For example, the ingress of water or of fluids containing water from the outside to the inside can thus be prevented because of this. The ingress of water or the like can lead to malfunctions of the working device, to the point of the formation of voltage creepage distances.

In addition, a hydraulic medium pressure, which can optionally lead to an incremental discharge of hydraulic fluid from the inside to the outside, can form during operation of the working device, in particular in the joining region of the hydraulic cylinder. Such a hydraulic medium discharge can optionally be provided in a systematic manner. For this purpose, defined paths can optionally be provided in the joining region of the hydraulic cylinder, via which the hydraulic medium can optionally escape directed to the outside. For this purpose, a relief valve can further, and preferably be provided, for example in the form of a non-return valve. This relief valve preferably opens only when a predetermined pressure limit value is exceeded. The relief valve is preferably closed in the non-pressurized initial position.

As a result of one of these embodiments, optionally also as a result of a combination of several of the above-described embodiments, a working device is formed in an improved manner in particular with regard to the safety of the user when handling the working device, for example in the high-voltage range.

The hydraulic cylinder can be formed so as to be split into two in the usual way, see EP 1 084 798 A2 (U.S. Pat. No. 6,718,870 B1) by thus forming a removable working head of the working device, which is provided with a part of the hydraulic cylinder, and a remaining part of the working device. A part or the entire hydraulic cylinder is thus optionally also arranged in the remaining part of the working device, with the hydraulic piston or a hydraulic piston head, which additionally also results in a functional division into a working device part of the working device and a remaining part of the working device, in particular comprising the working head. The working device part is provided outside of and, with respect to the working head, facing away from the hydraulic cylinder.

According to the described formation, the working device part is electrically insulated by the separating layer with respect to the working head and at least with respect to the hydraulic cylinder. Due to the fact that the hydraulic line also extends through the separating layer and a partial region of the hydraulic line consists of an electrically insulating material, virtually only the free interior space of the hydraulic line remains as being formed so as not to pass through the separating layer, but being filled with hydraulic medium in the operating state. The hydraulic medium, which is usually a hydraulic oil, is also electrically insulating per se, so that a complete electrically insulating separation can be attained in this way.

The hydraulic line can be part, in particular integral part of the working head and/or of the handle region, thus further part of the preferably handheld working device as a whole. In the case of a handheld working device of this type, an accumulator (or optionally a power cable connection), the electric motor, a pump, a hydraulic medium storage container, the hydraulic line, and the hydraulic cylinder, are received with the hydraulic piston in a uniform, rigid housing, which simultaneously also forms a handle region for a handheld operation, in particular also a one-handed operation, of the working device. As a whole, the working device can thus be moved freely and handled with the working head, which protrudes over the housing.

If with respect to the formation of the hydraulic line over an essential portion of its length of an electrically insulating material it is in fact preferred that an electrically insulating separating layer is furthermore also provided, which passes through the working device in a crossing manner for the electrical separation from the working device part in the region of an end of the hydraulic cylinder facing the drive device part, this is nonetheless not always required for the corresponding teaching of the invention.

The hydraulic line can consist, at least in some sections, of a hydraulic hose, in particular for connecting the working head to a drive unit for generating the hydraulic pressure. A hydraulic hose of this type can consist of a non-electrically conductive, high pressure-resistant material, for example of braids of aramid fibers.

A hydraulic hose of this type can be connected directly or also indirectly to the hydraulic cylinder by interconnecting a device-side rigid hydraulic line section, for example via a plug/latching connection or via a screw connection.

Over an essential portion of the length, the hydraulic line or the hydraulic hose, respectively, is preferably formed from an electrically insulating material, in particular in the connection region to the hydraulic cylinder. As a result of its arrangement and longitudinal formation in the use position of the working device, the electrically insulating material of the hydraulic line can be part of the separating layer, for the electrical insulation of the working head with respect to the handle region connected upstream (viewed opposite to the direction of action of the hydraulic pressure during operation go the working device). Starting at the connection to the hydraulic cylinder, the insulation of the hydraulic line can thus further extend at least over approximately 10 to 12 mm, with a preferred flashover resistance of approximately 10 kV/cm. In addition, this insulation of the hydraulic hose can extend up to 50 mm or more, for example even over 100 or 1,000 mm, up to, for example, 10,000 mm. When using a hydraulic hose, such a hydraulic hose is preferably provided, which has a pressure resistance of 700 bar or more and/or a burst pressure of 2,800 or more. Optionally, the insulated hydraulic hose can represent the connection between the working head and a drive device part essentially on its own.

On the one hand, a radial collar optionally provided between handle region and working head can serve as optical limitation between handle region and working head, in particular as optical limitation between the electrically insulated region and the optionally electrically non-insulated working head region. In preferred embodiment, the radial collar moreover additionally results in a mechanical hindrance, in particular with respect to a slipping of the hand or of individual fingers of the hand gripping the working device in the handle region in the direction of the working head.

In the case of a formation of a tapering region adjoining the handle region on the working head side, this tapering region can be limited by the radial collar on the working head side. The tapering region acts in the manner of a trench, in particular for preventing a slipping of the hand or of individual fingers of said hand gripping the working device in the handle region in the direction of the working head.

For this purpose, the tapering region can have a radial level of extension, which axially limits the tapering region on one end with respect to the section of the handle region, and an axial level of extension, which results between the handle region and the working head region or the radial collar, respectively, which corresponds to the thickness of a finger or more, thus as a further example approximately at least 8 mm to 25 or 30 mm or more as a further example.

The radial collar includes of an electrically non-conductive material. The radial collar can thus further be part of the electrically insulating separating layer or an embodiment of this separating layer, which is lengthened radially to the outside, respectively.

The mentioned separating layer is not necessarily formed integrally. It can consist of several separating layer parts, which are optionally arranged so as to also overlap over certain sections.

As an alternative to or also in combination with the arrangement of a separating layer, but optionally also an electrically insulating formation of the hydraulic cylinder, the hydraulic piston, in particular the corresponding piston head, which cooperates with the cylinder wall, can be formed in an electrically insulating manner. As a result of such a measure, the hydraulic piston can have, for example, an insulation layer as separating layer, which covers the piston head and which can consist of plastic or of a ceramic material. It can also be a ceramic/plastic composite material. The piston head as a whole can also be made of an electrically insulating material, thus for example of a—preferably pressure-resistant—plastic or of ceramic.

As a further alternative or in combination, a limitation of the displaceability of the hydraulic piston in the direction of the drive device part and thus preferably in the direction of an initial position can be provided. This can be provided by means of a provided stop for the hydraulic piston, in particular the piston head. A stop of this type can further, and preferably, be made of an electrically insulating material, for example assigned to a base of the hydraulic cylinder facing the piston head.

Due to a stop of this type, a minimum distance between the piston base and in particular the facing base of the hydraulic cylinder can be maintained, in particular in the above-described initial position, which distance exceeds the distance necessary for the electrical insulation. The distance necessary for the electrical insulation between a part, which may be live, and an electrically conductive part, which is to be electrically insulated for this purpose, is approximately 10 to 12 mm with a usual flashover resistance of approximately 10 kV/cm. This in particular in those cases, when air, optionally ambient air, is present between the respective device parts. Oil, such as, for example, hydraulic medium, does have a much better insulating effect as compared to air. However, a necessary distance of between 10 and 12 mm is preferably also maintained in such a case.

According to the invention, this minimum distance is exceeded in a position of the piston head, in particular in the initial position of the device. With regard to this, a minimum distance of, for example 12 to 15 mm, can thus set in.

The hydraulic cylinder can be covered by the mentioned separating layer on the outer side of the wall and/or on the inner side of the wall. A coverage on the outer side of the wall of the hydraulic cylinder with a separating layer can thus be provided, in the case of which the hydraulic cylinder is assigned to the working head. An arrangement of the separating layer on the inner side of the wall in the hydraulic cylinder lends itself for embodiments, in the case of which the hydraulic cylinder is assigned to the drive device part. In the case of such an embodiment, the separating layer provided on the inner side of the wall of the hydraulic cylinder can simultaneously provide for the limitation of the displaceability of the piston head.

As a whole, the hydraulic cylinder, in particular the circumferential cylinder wall thereof, furthermore optionally additionally or also only one hydraulic cylinder base, can additionally be made of an electrically insulating material. Such an embodiment can be used, for example, in the case of so-called low-pressure working devices, as further example in the case of working devices with a maximum hydraulic pressure of approximately 150 bar. Hydraulic cylinders made of a metal material are preferably used in the case of the usual hydraulic working devices with a hydraulic pressure of up to 600 bar.

With regard to the assembly for sealing an intermediate space between two part, a possible solution of the object can be provided according to a further idea of the invention, wherein the assembly is designed against ingress of a medium from the outside to the inside, and wherein an internally higher pressure can simultaneously be reduced by means of the assembly, wherein the assembly further has a closed annularly circumferential sealing element consisting of elastic material, which, in an initial state, bears sealingly over its entire circumference under pre-load into a sealing position against the two parts, wherein, in addition, a movement of the sealing element to the outside and lift-off from one of the parts is released over at least a portion of the circumference, wherein the sealing element further spans a plane, and the movement of the sealing element perpendicular to the plane is only released over a portion of the circumference.

As a result of such an embodiment, a sealing element, which acts in a valve-like manner, for sealing an intermediate space between two parts can be provided. The sealing element can thereby initially and on its own fill a sealing function in a usual, no-load initial position, in which the sealing element rests in a sealing seat, which seals the intermediate space between the parts, as a result of the provided pre-load. Over its entire circumference, the sealing element thereby preferably acts sealingly against the offered surface areas of the two parts. An ingress, in particular of medium, from the outside to the inside, thus optionally into an electrically impinged or electrically conductive region, in addition optionally for example into a hydraulic region, is thus counteracted.

However, the same sealing element can yield from the inside in the direction to the outside at least over a portion of the circumference thereof in response to corresponding pressurization, and can thereby preferably lift off from one of the two parts, so that a discharge path is at least temporarily released for reducing the internal pressure. The displacement or yielding movement, respectively, of the sealing element for releasing this path preferably takes place as a function of pressure, thus further preferably by exceeding a predetermined internal pressure, which thus acts against the sealing element from the inside. A valve-like opening in the region of the sealing element can be attained by exceeding a pressure threshold value, optionally as a function of the elasticity value of the sealing element material and/or of structural conditions in the region of the sealing seat. If the pressure value reverts to below this threshold value in the course of the pressure reduction, the sealing element preferably reverts automatically into the sealing position, which preferably acts over the entire circumference, as a result of the elastic resilience.

As a result of the above-described embodiment, a structurally simple assembly is provided, which is favorable with respect to the number of required components, for sealing an intermediate space between two parts against the ingress of a medium from the outside to the inside, which assembly can simultaneously be used in a valve-like manner to be able to reduce an internally higher pressure as a result of opening a discharge path to the outside.

In further embodiment, an assembly of the type in question can be used in a hydraulically actuated working device of the above-described type.

The features of the above-described independent claims are in each significant, both independently and in any combination with one another, whereby features of an independent claim can further be combined with the features of a further independent claim or with features of several independent claims, further also only with individual features of one or several of the further independent claims.

Further features of the invention are described below, also in the figure description, often in their preferred assignment to the subject matter of claim 1 and/or of the or of the further independent claims, or to features of further claims. However, they can also be significant in an assignment to only individual features of claim 1 and/or of the or of the further independent claims, or of the respective further claim, or in each case independently.

It can be provided in the case of a possible embodiment that on the one hand, the hydraulic cylinder is surrounded on the outer side with a separating layer and, on the other hand, the hydraulic line, which leads to the hydraulic cylinder and opens out into the latter, is filled on the inner side with a separating layer at least over a portion of its length. The separating layers are brought together outside of the hydraulic cylinder in such a way that a virtually closed separating layer, with the exception of the interior space of the hydraulic line, results with respect to a separation to the working device part.

It can further be provided in this respect the hydraulic line has a plug interface, in which metallic sections of the hydraulic line are plugged together, but which are each separated from one another in an electrically insulating manner by means of an inner or outer separating layer, respectively.

An electrically insulating part surrounding the hydraulic cylinder on the outer side can be provided with a thread formation, by means of which it is threadedly connected on a metallic fixed part of the working device part. This preferably threaded connection provides a connection, which is optionally provided in addition to a separating option in the region of the hydraulic cylinder, of the working head to the working device part.

In addition to a separation lining on the inner side, the hydraulic line can also have separation casing on the outer side, which can continue all the way into an outer region of the hydraulic cylinder. This separation casing can optionally also form an outer surface area of the working device in the region of the hydraulic cylinder.

An electrically insulation separation between the working head, which optionally comes into contact with, for example, a high-voltage line, and the drive device part, which has the handle region and/or actuating buttons for a user for handling the device, thus results in particular in a use position of the working device. The electrical separation is thereby essentially provided transversely to a longitudinal extension of the working device, in particular in the region of the transition of the working head into the working device part. Viewed in a cross section, the electrical separation is preferably provided with an essentially U-shaped design of the insulating separating layer.

It can be provided that the hydraulic cylinder can be rotated around a longitudinal axis of the hydraulic cylinder relative to the electrically insulating part, which surrounds said hydraulic cylinder and which is preferably connected to the working device part in a stationary manner. This results in known handling advantages.

According to an embodiment, the separating layer can consist of an electrically insulating ceramic material.

In the alternative or in combination, the separating layer can consist of an electrically insulating plastic. For example, a pressure-resistant plastic can thus be used, a reinforced plastic as a further example, for example fiber-reinforced plastic, such as GRP or carbon fiber-reinforced plastic. With respect to a combinative solution, a ceramic material with a plastic content, or embedded plastic parts, can be formed as composite part.

In addition, the hydraulic cylinder can also be a plastic cylinder having a stabilizing core. As a further example, a corresponding metal reinforcement can thus be overmolded with an electrically insulating plastic.

Plastics, such as, for example, polyamide, have a flashover resistance of approximately 22 kV/mm. To also attain this flashover resistance of 22 k V/mm in the case of an insulation by using a ceramic layer (ceramic has a flashover resistance of approximately 10 kV/mm), a ceramic layer is necessary, which has at least twice the thickness as compared to an insulating plastic layer. Including a desired safety, a ceramic layer of a thickness of more than one millimeter is thus provided, provided that this ceramic layer is used, for example, for the hydraulic cylinder. A thickness of such a ceramic layer of 1.5 to 3 mm or more is provided in this respect.

In further embodiment, seals, such as, for example, O-rings, are also made of an insulating material, if possible, also in particular in regions of the working device, which are to be electrically insulated. Common seals have a high content of soot and are therefore also conductive. In terms of the electrical insulation of the drive device part to the working head, seals, such as, for example, O-rings, for example of a silicon material, which is therefore preferably also as pure as possible, are preferably used, in particular in the respective region.

In addition to the motor and the pump, the working device part of the working device can also have further units, thus for example a hydraulic medium storage chamber, and/or a gear mechanism, and/or an accumulator, and/or a display, and/or a control unit, optionally having a microprocessor, and/or operating elements protruding on the outside on the device side, such as, in particular an operating switch.

Independently of the mentioned insulating separation between the hydraulic cylinder and the working device part of the working device, the working head can be provided in an exchangeable manner in the described way, preferably by means of a split formation and threaded connectability of the hydraulic cylinder. The electrical insulation can also extend at least over a certain portion of the length of the hydraulic cylinder, starting at the end, which faces the working device part of the working device. The length is thereby provided in the direction of a displacement direction of the hydraulic piston in the hydraulic cylinder.

In the case of such an embodiment, a working device part can thus be formed, which, compared to conventional working device parts, is not formed separately with respect to an electrical insulation. Considered individually with respect to a protection against electrical high voltage, it does not need to have any special electrically insulating measures. They can be limited to the mentioned plastic layer, which is formed so as to pass through or cross the working device, respectively.

When working on live parts (high voltage), the user of a working device embodied in this way is protected against an electric shock.

The parts made of electrically insulating plastic, which effect the insulation, can be made, for example, in the plastic injection molding process. A plastic, which is suitable to absorb compressive forces of up to, for example, 90 bar, can, and preferably, be used at least in the region of the lining of the hydraulic line.

With respect to a possible sealing of the hydraulic cylinder in a joining region, in particular against ingress of a fluid into the hydraulically actuated working device from the outside, the seal or the assembly, respectively, can be formed according to a possible embodiment by an annularly continuous sealing element or can have such a sealing element, respectively. As a further example, an O-ring, in particular made of a thermoplastic material or a rubber material, can serve to form a sealing element of this type.

In addition, the sealing element can rest in a sealing seat formed in a joining region, which sealing seat can optionally also permit an at least partial elastic movability of the sealing element in the use position, viewed over the circumference.

In further embodiment, this can be used, for example, such that the relief valve is formed by using the sealing element. The relief valve and the seal can thus be formed jointly by means of essentially only one component, namely by means of the annularly continuous sealing element.

Over its circumference, the sealing element for forming the relief valve can thereby have a partial region, which can be moved into a position, which opens the relief valve, by means of the hydraulic medium pressure. When exceeding a predetermined hydraulic medium pressure in the joining region of the hydraulic cylinder, the sealing element can thus be capable of being partially displaced into a relief position. This displacement can, and preferably, be supported as a result of an elastic embodiment of the sealing element, in particular in the above-specified circumferential partial region.

It can further be preferred in this context that such a partial and preferably limited movement of the sealing element is possible only with respect to an opening in terms of a relief valve, in order to be able to thus allow hydraulic fluid to escape systematically from the inside to the outside. In contrast, an ability to yield elastically of the sealing element is preferably not possible in the opposite direction—thus from the outside to the inside—so that the optionally systematically predetermined path for the discharge of the hydraulic medium remains closed against ingress of fluid from the outside in this direction, preferably also in the case of relatively high pressure.

According to a possible embodiment, the moveability of the partial region of the sealing element can be provided by means of a recess in a sealing seat of the hydraulic cylinder, which receives the sealing element, or in a section of the drive device part, which cooperates with the hydraulic cylinder in the joining region. The recess can thereby be dimensioned and positioned in such a way that a yielding of a partial region of the sealing element can yield to form the relief valve in the direction of this recess, in particular when exceeding a pressure value of the hydraulic medium in the joining region. In a possible embodiment, the moveability of the sealing element partial region can thus further only be capable of being attained by forming a recess of this type. Viewed over the circumference, a recess of this type can, and preferably, extend over a partial region, while the sealing element can also be sealingly supported in the positive pressure position or in the relief valve position, respectively, over the further, non-recessed region.

When arranging a seal of this type in a working device, which has an electrically insulating separating layer, which passes through in a crossing manner, for the electrical separation, the seal can be provided between an electrically conductive housing section of the working device part or of the hydraulic cylinder and the electrically insulating separating layer. The above-described recess can thereby further be provided in the region of the electrically conductive housing section or of the electrically conductive hydraulic cylinder, and/or alternatively in the region of the electrically insulating separating layer.

In further embodiment, two seals against ingress of fluid from the outside and/or for forming relief valves can be provided. According to a possible embodiment, these two seals can be arranged essentially concentrically, but axially spaced apart from one another, with respect to the preferred annular formation of the sealing elements.

The sealing element can span a plane, thus for example, and preferably, a plane, which is spanned perpendicular to an axis of rotation of the sealing element, in which plane a largest extension of the sealing element, thus as a further example, a largest diameter, can simultaneously be provided.

According to a possible embodiment, the movement of the sealing element upon release of a discharge path for the pressure reduction from the inside to the outside can be provided in the plane to the outside. In the case of an exemplary circular embodiment of the sealing element, for example when formed in the form of an O-ring, such a yielding movement can thus further result to the outside, in particular radially to the outside, under at least partial enlargement of the sealing element beyond the diameter in the pre-loaded state.

In response to such a movement to the outside, an expansion of partial regions of the sealing element and/or optionally a compression of other parts of the sealing element can preferably be attained by means of the elastically resilient embodiment of the sealing element, in order to thus also release a discharge path by lifting off a partial region of the sealing element off one of the parts, which are to be sealed.

In the alternative to or also in combination with a movement directed to the outside, a movement provided perpendicular to the plane can additionally be attained. If a, for example annular sealing element preferably moves partially beyond the outer diameter in response to a movement to the outside, an elongation of the respective part of the sealing element within a projection surface of the sealing element in the axial direction thereof can optionally be attained in response to a movement perpendicular to the plane.

In further embodiment, the movement of the sealing element perpendicular to the plane can be overlapped by a movement of the sealing element in the plane to the outside. As a result of this embodiment, the section of the sealing element, which acts in a valve-like manner thereby, can optionally yield out of the plane and beyond the circumference of the sealing element into a valve open position in the sealing position.

According to a possible embodiment, the parts, which are to be sealed against one another in the intermediate space, can be immovable to one another, thus in particular with respect to a possible direction of rotation around a common longitudinal axis and/or with respect to a linear direction along, for example, an axis of rotation. The parts can thus further be parts of a working device, for example of a hydraulically actuatable working device.

In a possible embodiment, an inclined surface, via which the sealing element can move in response to a pressure reduction, optionally within a certain circumferential region, can be formed at one of the parts. The sealing element can thus further preferably move over a certain circumferential region, more preferably over a small circumferential region of, for example, 5 to 20 percent, as a further example approximately 7 to 15 percent of the entire circumference, for the pressure reduction along the inclined surface. The inclined surface can thereby, and more preferably, be arranged in such a way that a slope results in the direction of the movement of the sealing element section in response to pressure reduction.

The inclined surface can thus have a supportive effect on the sealing elements, in particular with respect to an automatic displacement back into the complete sealing seat.

The movement of the sealing element perpendicular to the plane can also only (exclusively) be released in one direction. In the opposite direction thereto, a corresponding displacement can be prevented by means of structural measures at the one part. The yielding movement of the sealing element, in particular of the partial section of the sealing element, can thus, and preferably, be predetermined.

In addition, the movement of the sealing element perpendicular to the plane can be released only over a portion of the circumference, thus for example over 5 to 30 percent of the circumference, as a further example 7 to 15 percent of the circumference. The circumferential region of the sealing element, which exceeds this, preferably also remains in the sealing seat in the movement position, in order to provide for a pressure reduction from the inside to the outside.

According to a possible embodiment, the pre-loading of the sealing element can be predetermined by means of a circumferential length of the sealing element. In the sealing seat for sealing against ingress of a medium from the outside to the inside, the sealing element can thereby rest in the sealing seat under pre-loading, i.e. with reference to a possible embodiment of the sealing element as O-ring in the sealing seat position having a larger diameter than in a no-load position of the sealing element, in particular a non-installation position.

From this pre-loaded initial position in the sealing position, the sealing element can travel from the sealing seat and can release a discharge path in a valve-like manner, at least partially over the circumference when exceeding a corresponding pressure value on the inner side.

The pre-loading can thereby further be predetermined by means of a gap width between the parts, in the alternative to or also in combination with the pre-loading via the circumferential length.

To release the movement of the sealing element, a contact surface, which is provided transversely to the extension of the plane, can be formed at one of the parts only over a portion of the circumference. The contact surface of the corresponding other part, in contrast, is thereby preferably provided over the entire circumference.

This results in an interruption of the contact surface for the sealing element only over a portion of the circumference, into which clearance, which results therefrom, the assigned partial section of the sealing element can yield perpendicular to the extension of the plane, in order to release a discharge path.

The invention also relates to a manual working device, preferably a hydraulically actuated working device of the above-described type, such as pliers or a press, in particular pliers or a press, which can be electro-hydraulically actuated or via an electric motor, having a sensor for detecting an electric voltage, assigned to a working head of the manual working device.

As is well-known, working under voltage, in particular high voltage, involves great risks for the user of the manual working device. Solutions, which have a corresponding sensor system for detecting an electric voltage, are to trigger a corresponding warning here, for example in the form of a light and/or sound signal.

It is the object of the present invention to further improve a manual working device of the type in question.

This problem is initially and essentially solved in that the sensor is formed for the radio connection with a receiver outside of the manual working device. The radio connection can take place in the usual way via a network (for example WLAN or WPAN), but additionally also in the field of the near field communication, for example via Bluetooth.

The radio connection can be suitable for the purpose that the corresponding manual working device can correspond with the receiver or a plurality of receivers, and can announce, when this manual working device detects an electric voltage.

Via the radio connection, this message can be sent to an, optionally central, detection point, for example in order to record the work process. In addition, a voltage detection of this type leads to the triggering of a corresponding warning at the detecting working device, which warning can also be transferred via the radio connection to one or several receivers as correspondingly encoded signal, thus as a further example also to further manual working devices, which are optionally used or which are to be used in the same region or in the same space.

For the radio connection, the manual working device is thus provided with a transmitter, in addition optionally additionally also with a receiver.

For the radio connection via a possible mobile radio network, the manual working device can be provided with a corresponding module, further optionally having a SIM card.

To use a possible mobile radio network, the manual working device can additionally have a near field communication module, such as, for example, a Bluetooth module, for the direct communication for example with a mobile radio device, which the user, who carries the manual working device, carries with him. The desired communication and forwarding of corresponding messages to other receivers is made possible via this mobile radio device.

BRIEF DESCRIPTION OF THE DRAWINGS

The invention will be described below on the basis of the enclosed drawings, which, however, only represents exemplary embodiments. A part, which is described only based on one of the exemplary embodiments, and which is not replaced by another part in a further exemplary embodiment due to the special feature emphasized therein, is thus also described for this further exemplary embodiment as an at least possible existing part. In the drawing:

FIG. 7 shows the enlargement of the region VII in FIG. 6 in a sectional illustration;

FIG. 15 shows the enlarged section according to the line XV-XV in FIG. 14;

FIG. 16 shows a working head of the working device with a working cylinder as well as a separating layer with two sealing elements and one fixed part in a perspective exploded illustration;

FIG. 17 shows the separating layer in a further perspective illustration, in addition to a magnified enlarged illustration;

DESCRIPTION OF THE EMBODIMENTS

Figure 1:
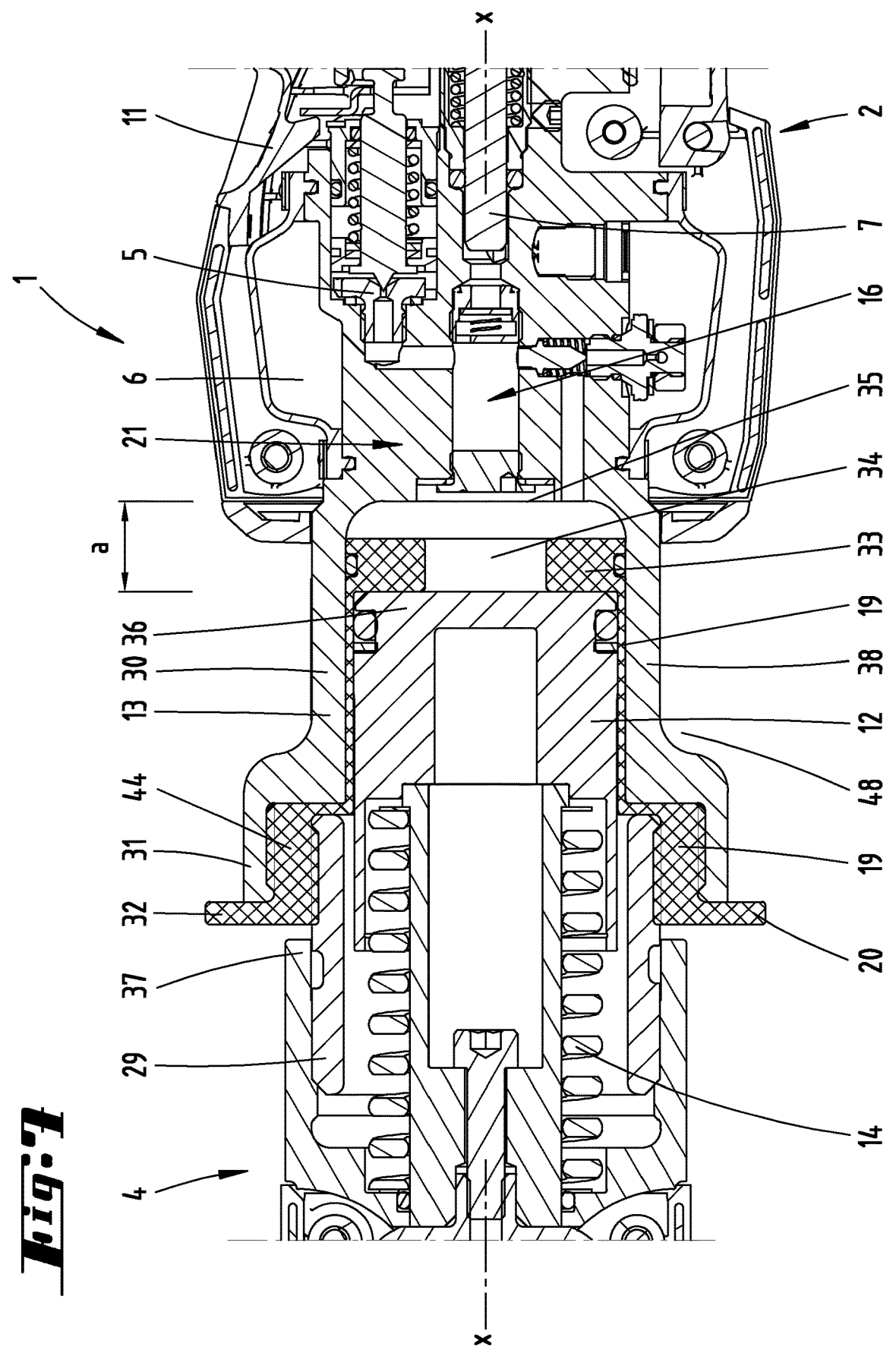
FIG. 1 shows a working device in a first embodiment in perspective illustration.

What is illustrated and described, initially with reference to the illustration in FIG. 1, is a working device 1, here in the form of an electro-hydraulically actuatable cutting device in rod-like embodiment. A working device 1 formed in such a way is known from the above-cited WO 2003/084719 A2 (U.S. Pat. No. 7,254,982 B2). The content of this WO-document or US-document, respectively, is hereby included in its entirety into the disclosure of the present invention, also for the purpose of including features of this WO-document or US-document, respectively, into claims of the present invention.

Figure 18:
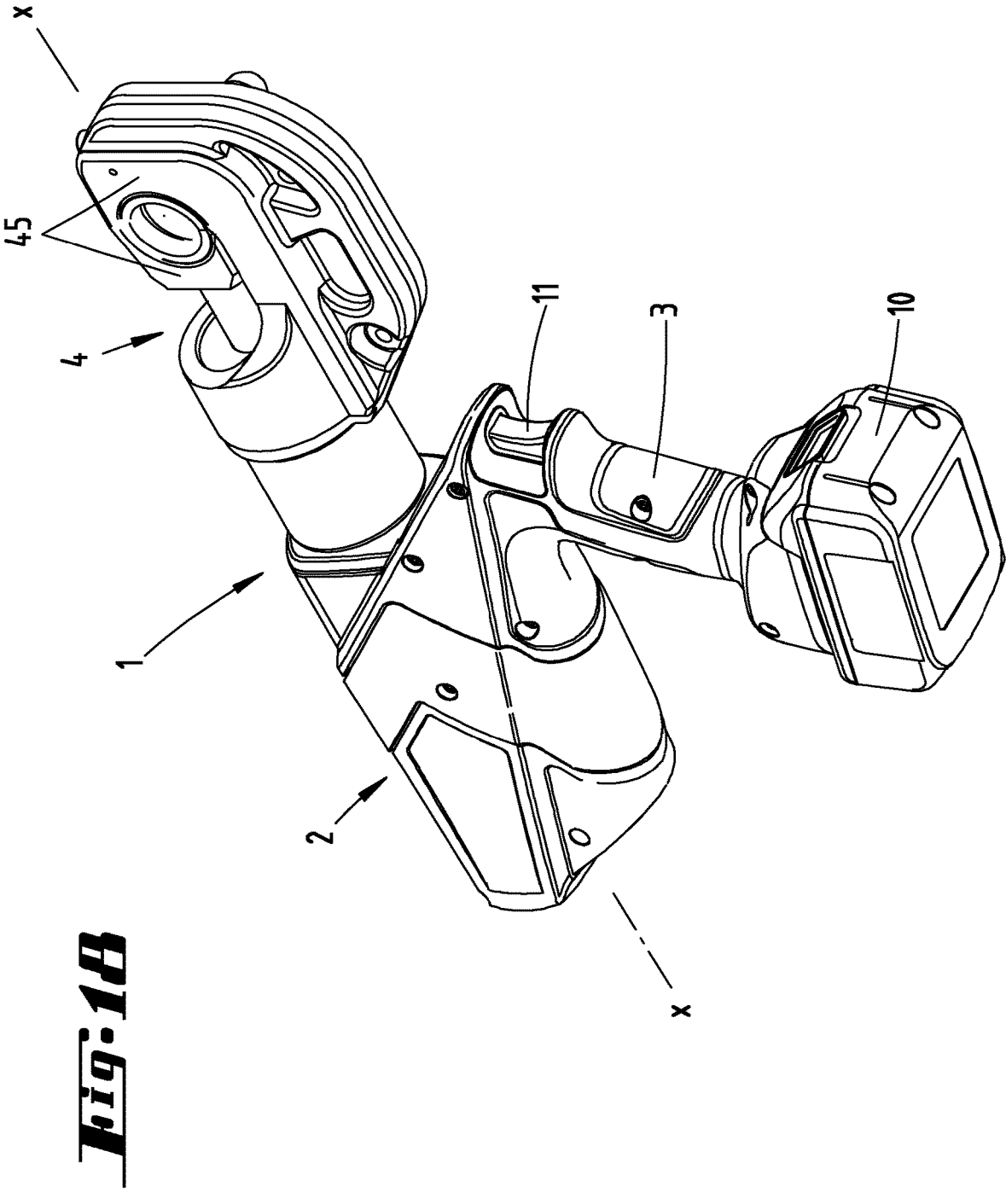
FIG. 18 shows a working device in further embodiment.

As can further be seen in an exemplary manner in the illustration in FIG. 18, a working device 1 of this type can, for example, also be provided as pressing device in gun-like embodiment. A working device 1 of this type is known from the above-cited WO 2014/108361 A1 (US 2015/0364889 A1). The content of this WO-document or US-document, respectively, is hereby also included in its entirety into the disclosure of the present invention, also for the purpose of including features of this WO-document or US-document, respectively, into claims of the present invention.

The manual device 1 initially and essentially has a drive device part 2, which, in the case of a rod-like embodiment according to FIG. 1, but also in the case of a gun-like embodiment according to FIG. 18, can simultaneously form a handle region 3. In the case of a gun-like embodiment of the working device 1 according to the illustration in FIG. 18, the handle region 3 extends essentially transversely to the drive device part 2.

Figure 5:
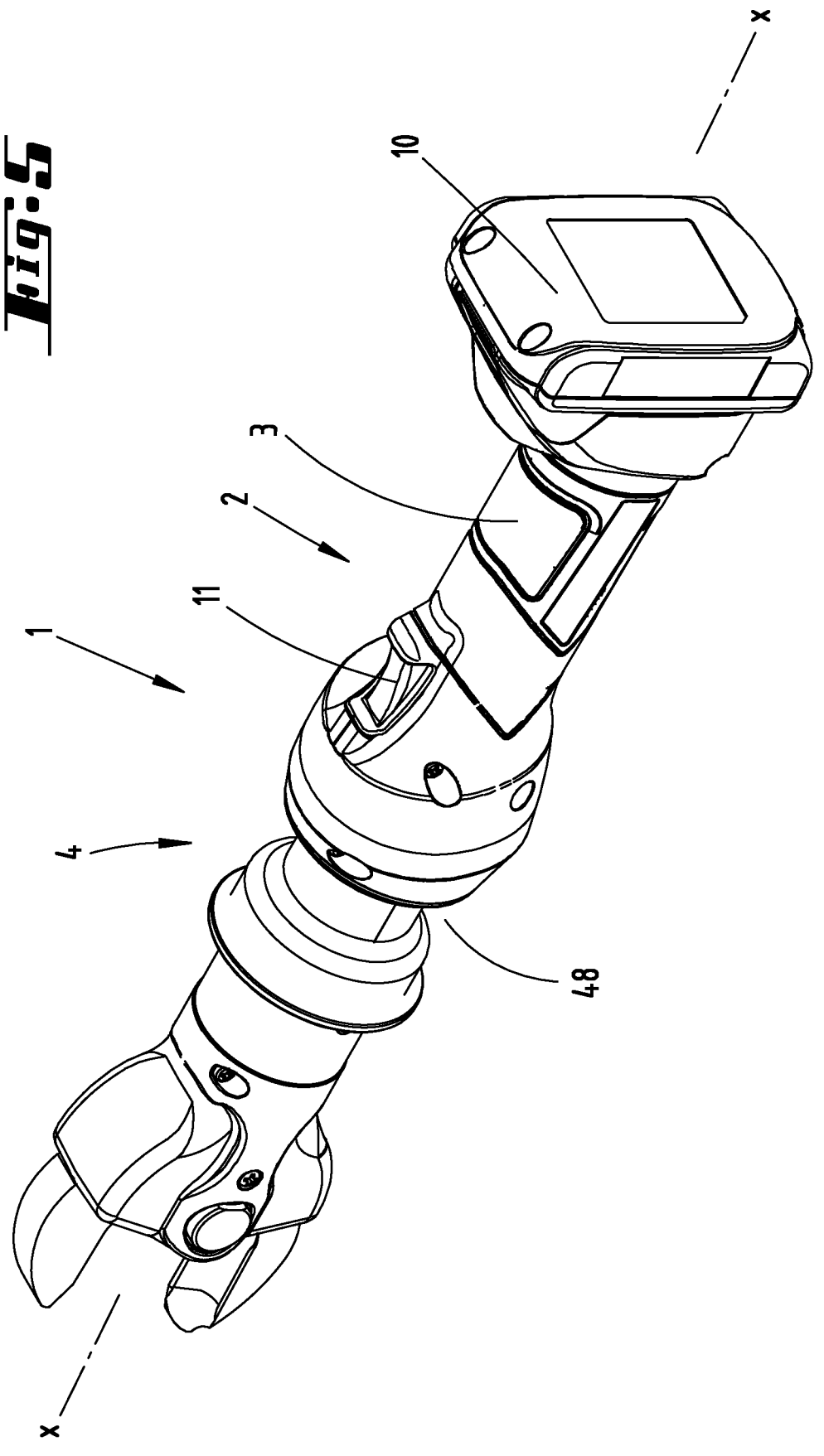
FIG. 5 shows a perspective illustration of a working device in a third embodiment.
Figure 6:
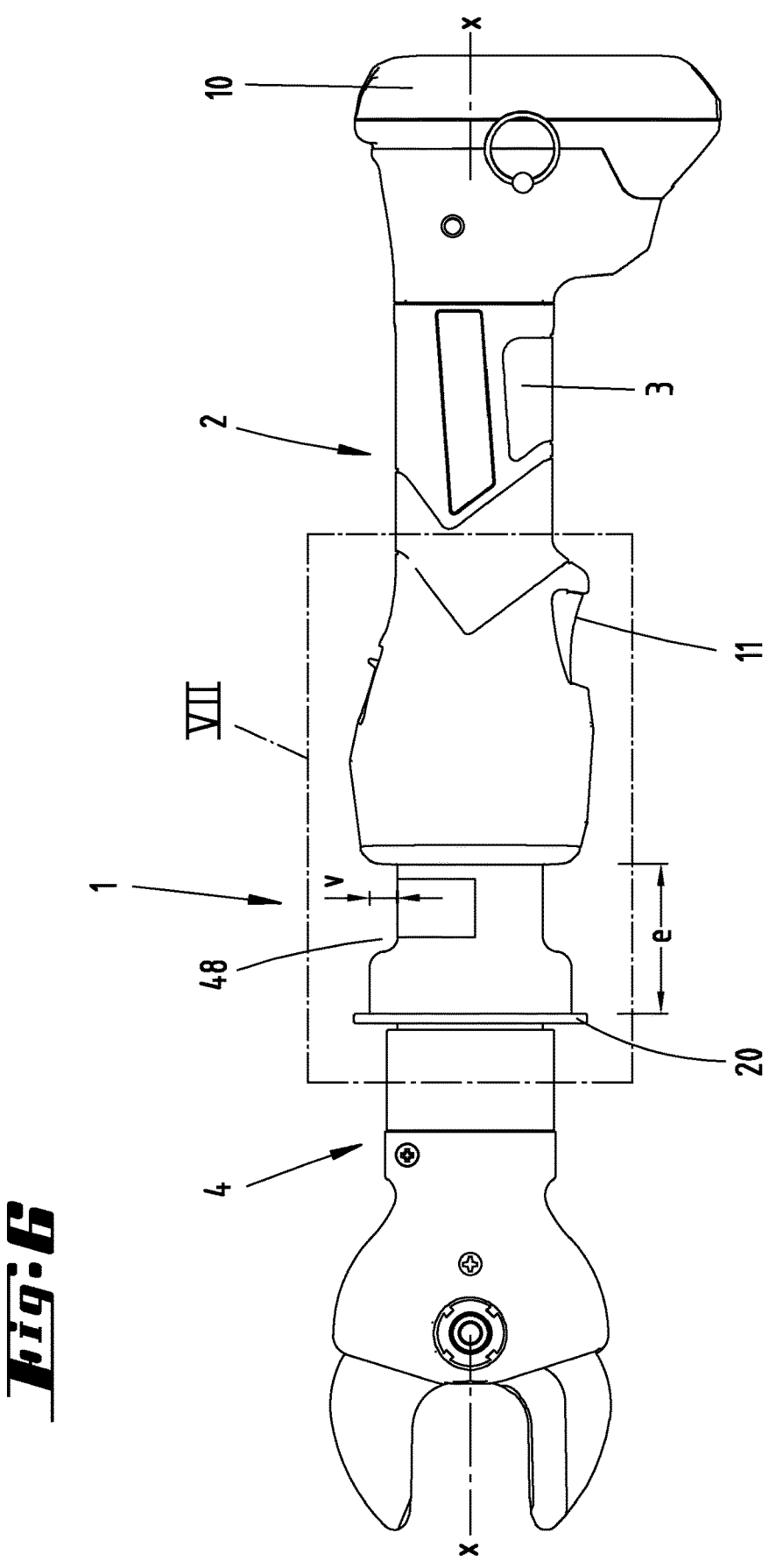
FIG. 6 shows the working device according to FIG. 5 in a side view.

Towards a free end of the working device, a working head 4, which can have two cutting jaws 45 in the exemplary embodiments illustrated in FIGS. 1 and 5, adjoins the drive device part 2. The respectively illustrated working head 4 is only exemplary. The working head according to FIG. 9 can thus, for example, also have pressing jaws 46. The working head 4 is preferably mounted in an exchangeable manner, more preferably by means of a separation in the region of the hydraulic cylinder 13, see also further below. In addition, and preferably, the working head 4 can be mounted in a freely rotatable manner around a working head longitudinal axis x relative to the drive device part 2 or to the corresponding receptacle 23, respectively, for the working head 4.

Figure 2:
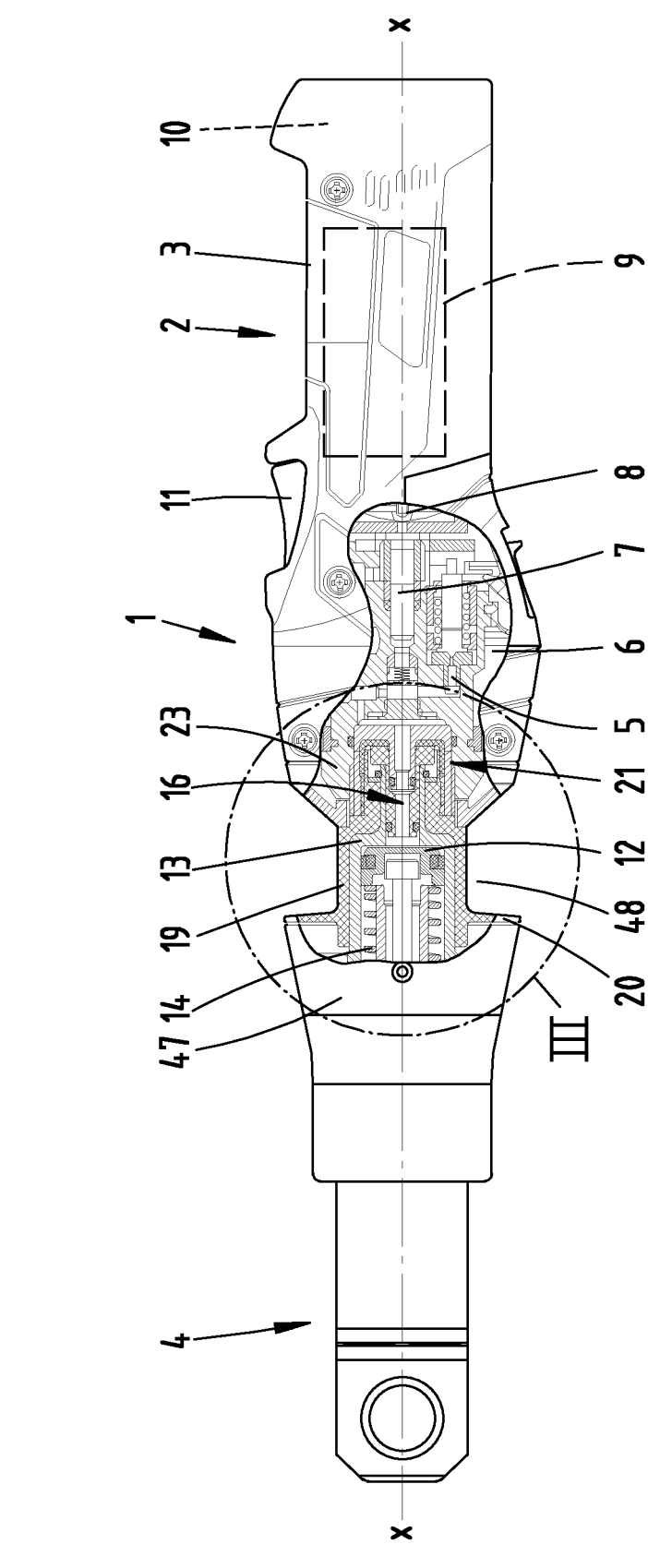
FIG. 2 shows the working device according to FIG. 1 in a partially cut side view.

With reference to, for example, the illustration in FIG. 2, the connection with the object described in the mentioned EP 1 519 813 B3 can be seen for instance with respect to a return valve 5, a tank 6, and a pump tappet 7. As a whole, it can also be seen in this context that a hydraulic medium pump 8 and an electric motor 9 for the hydraulic medium pump 8 can be provided in serial arrangement. The electrical supply in particular of the electric motor 9, but in addition also of a non-illustrated control unit and of further electrical components in the working device, is provided by means of the arrangement of an accumulator 10.

The handle region 3 is formed for the usual gripping of the working device housing by means of a hand. Assigned to the handle region 3, an actuating button 11 is provided in an ergonomically favorable manner.

In particular the above-mentioned components return valve 5, tank 6, hydraulic medium pump 8 with pump tappet 7, electric motor 9, the control unit, and further electrical components, as well as the actuating button 11, as a whole are preferably parts of the drive device part 2.

A hydraulic piston 12 is provided for displacing a working jaw, for example cutting jaw 45 or pressing jaw 46, in the working head 4. Said hydraulic piston can be displaced along the axis x in a hydraulic cylinder 13 against the force of a restoring spring 14.

When actuating the actuating button 11 accordingly via the pump tappet 7 during the operation of the working device 1, hydraulic medium 15 is pumped via a hydraulic line 16 into the hydraulic cylinder 13, in order to correspondingly impinge the piston front face, which faces the hydraulic medium 15.

The hydraulic piston 12, preferably with respect to a divisibility according to the mentioned EP 1 084 798 A2 or U.S. Pat. No. 6,718,870 B1, respectively, with respect to a hydraulic piston rod, the hydraulic cylinder 13, or in terms of the mentioned divisibility preferably a part of the hydraulic cylinder 13 can be parts of the working head 4.

According to the embodiments of FIGS. 1 to 4, the hydraulic cylinder 13 can have a portion of a hydraulic line 16, which opens out into it and which is formed as neck 17, which runs concentrically to the axis x, in the exemplary embodiment. This neck 17 is thus of reduced diameter with respect to the wall 18 of the hydraulic cylinder 13.

A continuing part 24 of the hydraulic line 16 is plug-guided or plug-mounted in the neck 17. A lining part 26 made of an electrically insulating material is arranged in the interior of the neck 17 and also extends in this overlap region with respect to the section of the neck 17, which is arranged in an overlapping manner to the continuing part 24, and thus provides an electrically insulating separation to the continuing part 24.

The hydraulic cylinder 13 is surrounded by an electrically insulating separating layer 19. The separating layer encompasses the hydraulic cylinder 13 in the region of the wall 18 of the hydraulic cylinder 13 over the entire circumference. In addition, the separating layer also encompasses the region of the neck 17, including the transition of the wall 18 into the neck 17.

The separating layer 19 as well as the lining part 26 and parts and regions also listed further below, which act in an electrically insulating manner in terms of the invention, can consist of a ceramic material or, in the alternative, and mostly preferred, of an electrically insulating plastic.

The separating layer 19 undergoes a continuation through the lining part 26 in the interior of the hydraulic line 16, by means of a molding of the lining part 26, which also engages over a free end of the neck 17. The separating layer 19 is formed in its extension along the neck 17 or also along and preferably partially nested in the continuing part 24, respectively, thus until it overlaps with the lining part 26.

Assigned to a free end of the neck 17, a plug-mounting with respect to the separating layer 19 of the hydraulic cylinder 13 can be provided, for example, by means of a retaining ring. Due to the fact that the separating layer 19 is positively connected, preferably threadedly connected, to a fixed part wall of the working device part, the mounting as a whole is attained thereby.

In the case of the illustrated exemplary embodiment and thus preferably, a section of the separating layer 19 surrounding the wall 18 of the hydraulic cylinder 13 is provided with a plate-like radial collar 20. Starting at the neck 17, the separating layer 19 extends beyond the region of the radial collar 20 (see in particular FIGS. 3, 4, and 9).

Figure 4:
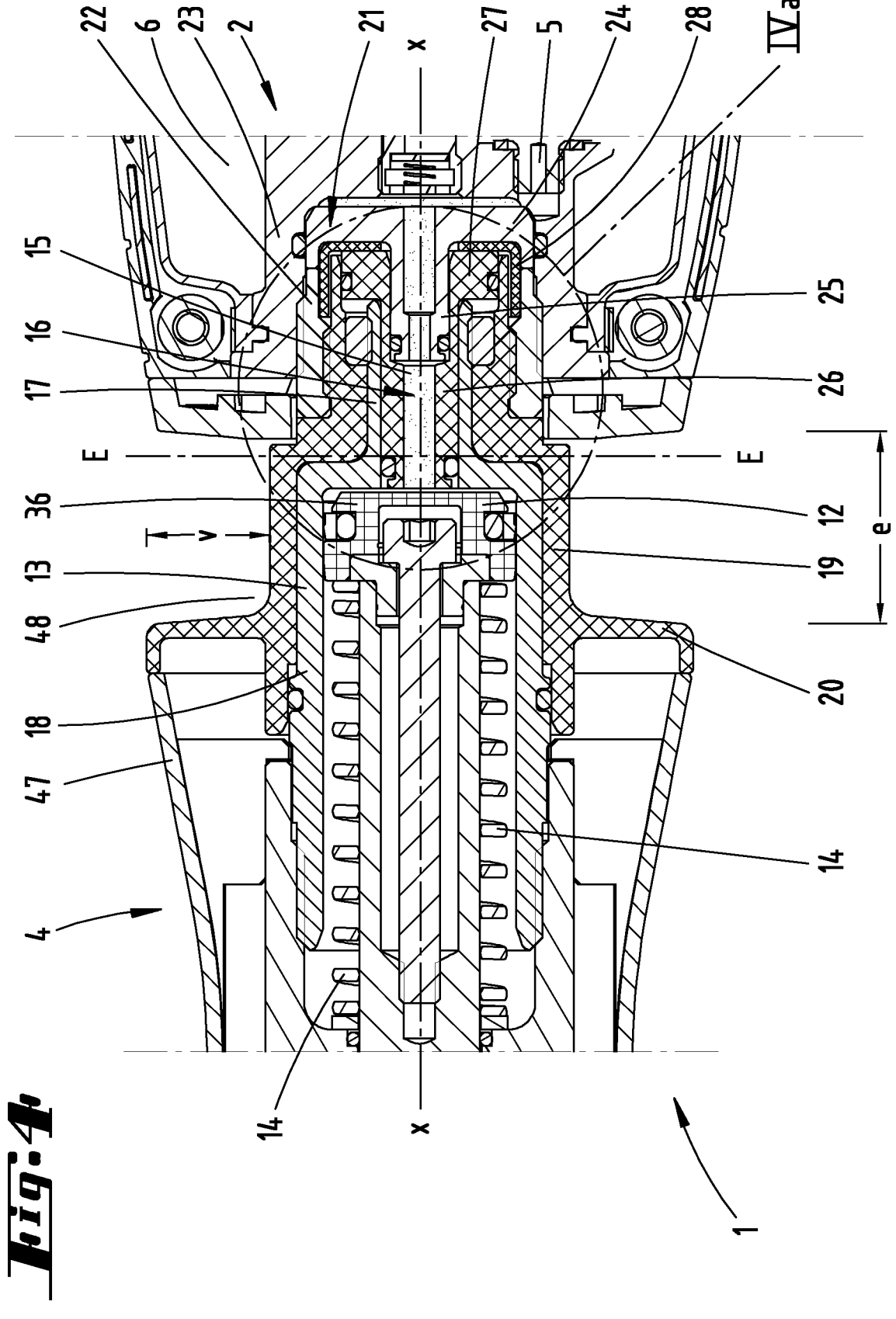
FIG. 4 shows the sectional illustration according to FIG. 3, relating to a second embodiment.
Figure 4A:
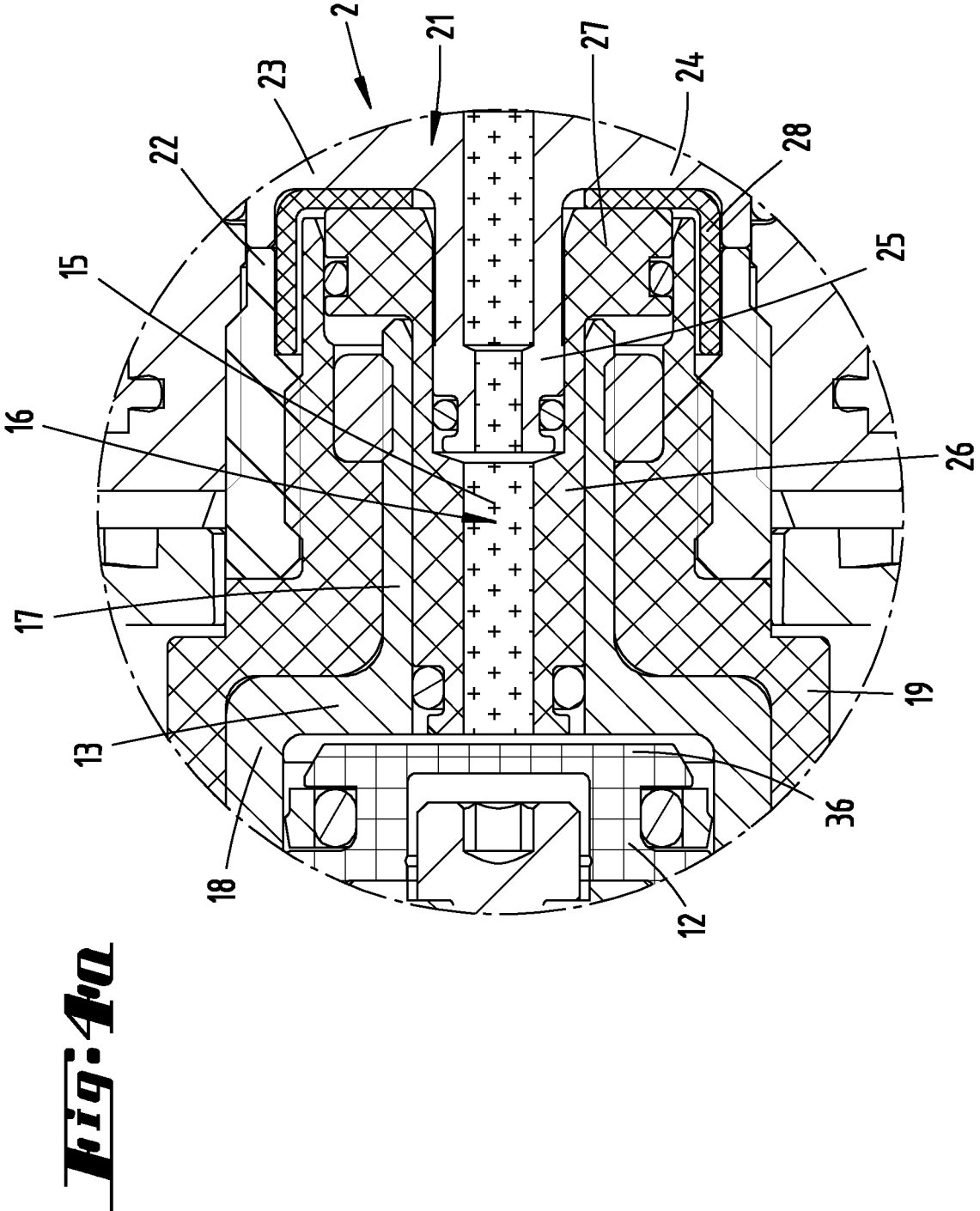
FIG. 4a shows the enlargement of the region IVa in FIG. 4.

As, for example, in the exemplary embodiment illustrated in FIG. 4, the radial collar 20 can have a radial extension, viewed based on the axis x, which can essentially correspond to the radial extension of the wall section 47 of the working head 4, adjoining the radial collar 20.

Figure 8:
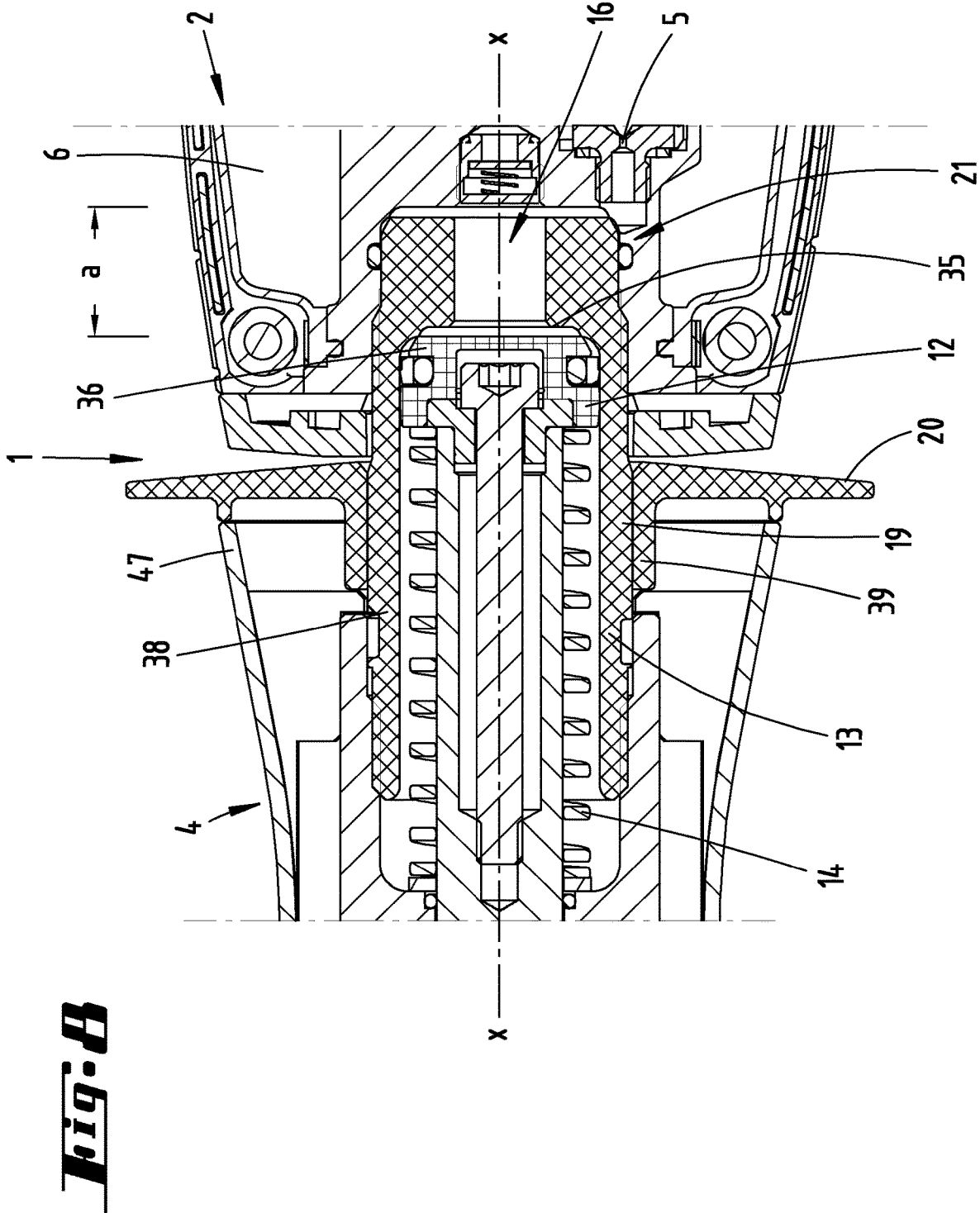
FIG. 8 shows a fourth embodiment in an illustration according to FIG. 3.
Figure 9:
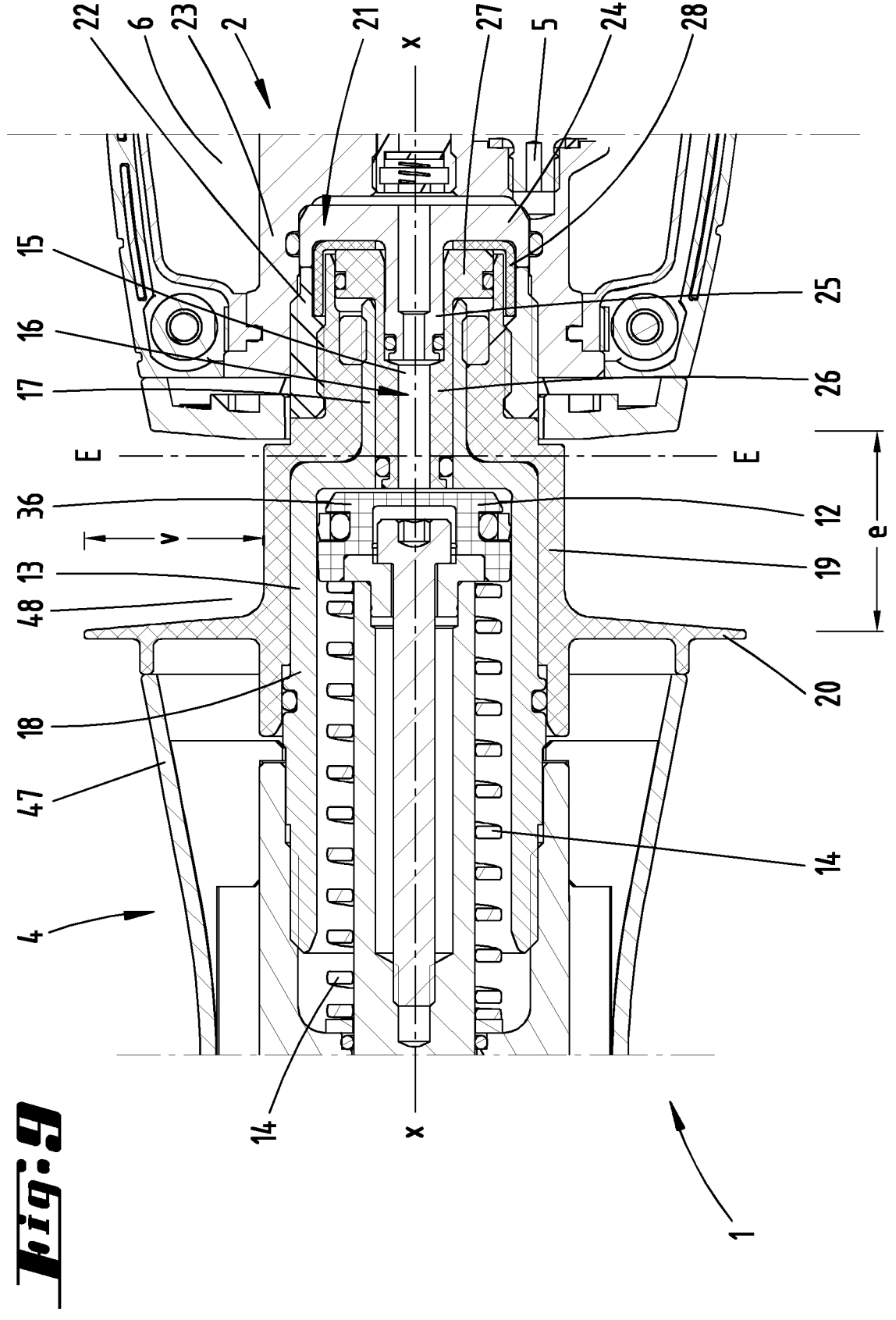
FIG. 9 shows a sectional illustration according to FIG. 4, relating a further embodiment.

As can further be seen from the illustration in FIG. 9, in addition also according to the illustration in FIG. 8, the radial collar 20 can, however, also extend radially beyond this wall section 47, for example with a radial level of protrusion beyond the wall section 47 of 5 mm to 15 mm, or 20 mm, or more millimeters.

In particular according to the exemplary embodiments in FIGS. 4 and 9, in addition also according to FIG. 7, a tapering region 48 can result between the handle region 3 and the handle region 3 to the radial collar 20 limiting the working head 4. Said tapering region can, and preferably, be limited in the axial direction, on one end by means of the drive device part 2 or the handle region 3, respectively, and axially on the other end preferably by means of the radial collar 20, optionally by means of an electrically insulated radial section of the wall section 47, for forming such a radial collar 20.

A trench, which is preferably circumferential with respect to the axis x, thus results in particular between the handle region 3 and the working head 4, for preventing a slipping of the hand gripping the working device from the handle region 3 in the direction of the working head 4.

For this purpose, the tapering region 48 is provided in a suitable manner with an axial level of extension e between the front faces of the handle region 3 facing one another or of the drive device part 2 and the radial collar 20, respectively, which level of extension e corresponds to at least the thickness of a finger, thus preferably at least 8 mm, in addition further preferably more than 8 mm, for example up to 20 or 30 mm, or more.

The radial level of extension v of the radial collar 20, via the section of the separating layer 19 connecting the working head 4 to the handle region 3 in a neck-like manner, or of the hydraulic cylinder 13, respectively, and thereby forming the base of the tapering region 48, can, and preferably, also correspond to at least the thickness of a finger, more preferably 8 mm or more, thus optionally up to 15 or 20 mm, or more.

In the region of the section of the separating layer 19 encompassing the neck 17, the separating layer 19 is completely encompassed circumferentially on the outer side of the wall by the already mentioned fixed part 21, which is pot-shaped as a whole and which simultaneously also forms the already mentioned part of the hydraulic line in the case of the exemplary embodiment and thus preferably. The fixed part 21 as well as the hydraulic cylinder 13 itself, including the neck 17, consists of a metallic material, preferably of steel. The circumferential fixed part wall 22 has an external thread, for cooperation with an assigned internal thread of the receptacle 23 provided in the drive device part 2.

As already described, the fixed part wall 22 is in threaded engagement on the inner side with the separating layer 19, which also surrounds the neck 17 in this region.

At the continuing part 24, the fixed part 21 has a base, from which a metallic section 25 starts centrally, passed through centrally by the axis x, which thus concretely forms the already mentioned part of the hydraulic line. In the region of its free end, the section 25 protrudes into the neck 17 by radially spacing apart the section outer surface from a neck inner surface. As already described, the radial spacing is filled by the lining part 26, and the insulation is thus attained.

On the inner side, following the axis x, the separating layer 19 is continued by the lining part 26 for forming a section of the hydraulic line 16, wherein the lining part 26 accordingly also consists of an electrically insulating material. The lining part 26 abuts on the neck 17 on the inner side of the wall and centrally forms an already mentioned part of the hydraulic line, which continues in the axial direction into the section of the hydraulic line of the fixed part-side metallic section 25.

Assigned to the free end of the neck 17, the lining part 26 has the already mentioned radial widening 27. This radial widening 27 underpins a free front face of the neck 17.

Figure 3:
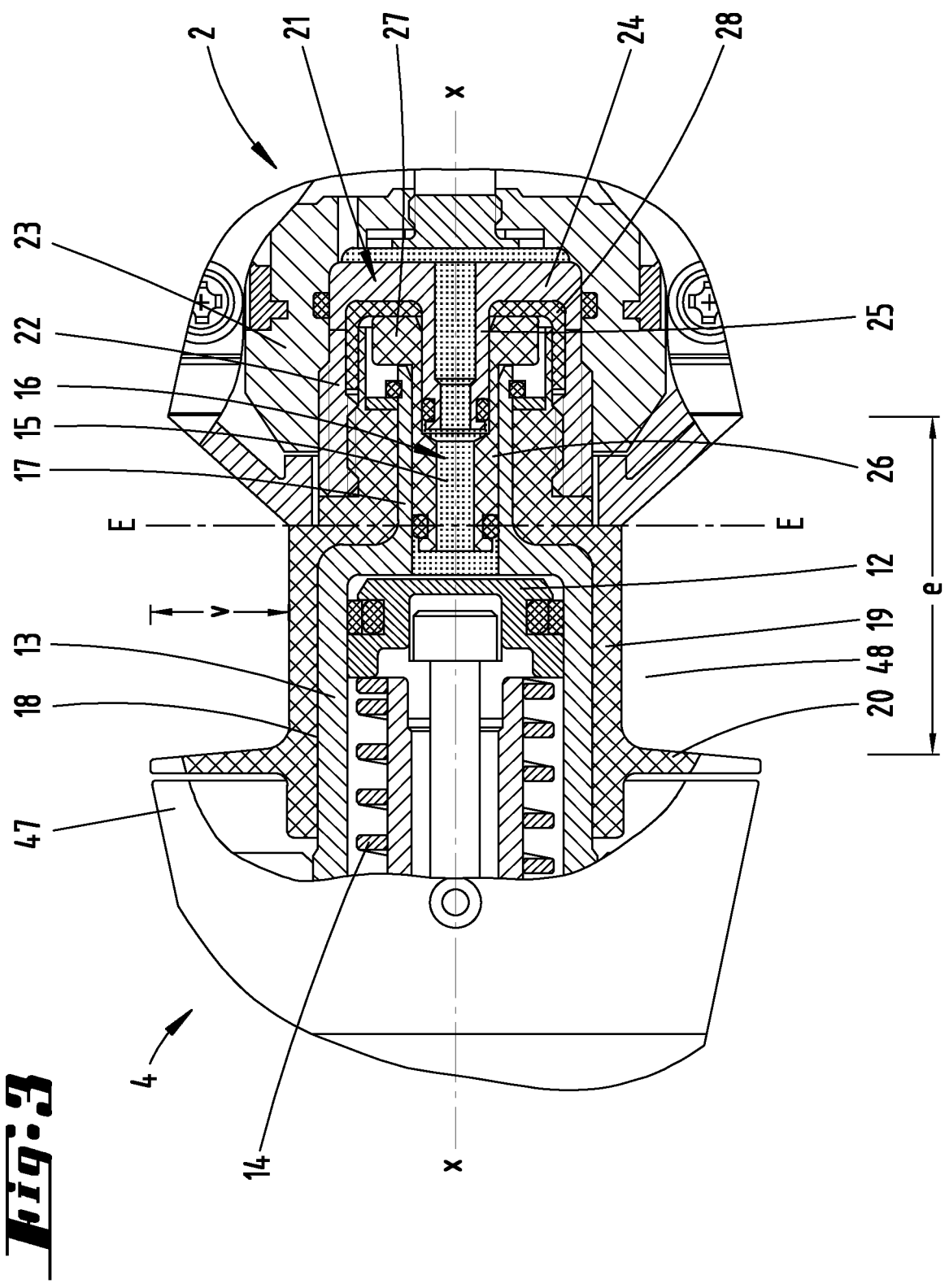
FIG. 3 shows the enlargement of the region III in FIG. 2.

According to the illustration in FIGS. 3 and 4, the separating layer 19 extends beyond the section, which is in threaded engagement with the fixed part 21, by encompassing the radial widening 27.

According to the illustration in FIG. 3, the surface areas of the base of the continuing part 24 and of the fixed part wall 22, which are directed in the direction of the hydraulic cylinder 13 or to the inside, respectively, can be covered with an electrically insulating element 28, for example plastic element.

The multi-part design of the fixed part 21, which can be seen in FIG. 3 and FIG. 4, can be provided solely due to a simplified producibility. These parts can generally also be integrally connected to one another.

More generally, an insulation layer results, which crosses the axis x and which is essentially oriented on an insulation plane E, and which electrically insulates the hydraulic cylinder 13 and thus the working head 4 as a whole completely with respect to the drive device part 2. The insulation layer preferably runs in a U-shaped manner, viewed in a cross section, wherein, more preferably, a pass-through through the hydraulic line 16 is provided in the region of the U-web.

The electrical insulation in the embodiments of FIGS. 1 to 4 is in particular provided by the nesting of the electrically insulating materials of the separating layer 19 and of the lining part 26, in which nesting the free end of the hydraulic cylinder 13 is received essentially completely in the region of the neck 17 thereof.

The hydraulic medium 15 provided in the hydraulic line 16, in particular in the duct of the lining part 26, acts in an electrically insulating manner, so that a flashover, for example from the metallic hydraulic cylinder 13 through the duct of the hydraulic line 16 to the metallic fixed part 21 and via this to the drive device part 2 is also prevented.

In the further embodiment illustrated in FIG. 7, the hydraulic cylinder 13 is formed so as to essentially be split into two in the longitudinal extension along the axis x, consisting of consisting of a working head-side cylinder part 29 and a cylinder part 30, which is arranged essentially in the axial extension to this cylinder part 29. The cylinder part 30 is thereby part of the drive device part 2, in particular fixedly arranged on the latter. A slide displacements of the piston head 36, to which pressure can be applied, along the axis x is preferably provided only in the region of the cylinder head 30.

The electrical insulation of the working head 4 with respect to the drive device part 2 takes place here as a result of a preferred inner lining of the hydraulic cylinder 13, in particular of the cylinder part 30 on the drive device part side. A separating layer 19 is thus provided, which initially and essentially completely circumferentially covers the inner cylinder surface, which cooperates with the circumferential hydraulic piston wall.

In the end facing the working head 4, the cylinder part 30 widens in a sleeve-like manner into a radial widening 31. In the cross section according to FIG. 7, the separating layer 19 follows this step-like widening and covers the step wall, which results in the step region and which extends transversely to the axis x, as well as the widening wall of the radial widening 31, which adjoins subsequently and is which directed to the inside, so as to finally extend on the front face of the radial widening 31 with a collar 32 radially to the outside beyond the annular front face of the radial widening 31 facing the working head 4. With respect to the largest diameter of the radial widening 31, the collar 32 is of increased diameter.

A radial thickness, which is significantly larger compared to the further overlap regions, for example on the inner side of the wall of the cylinder surface, is provided in the section 44 of the separating layer 19, which runs circular cylindrically to the axis x in the radial widening region of the cylinder part 30. In this connection, an approximately 5-fold thickness can thus be provided compared to the section of the separating layer 19, which cooperates with the circumferential piston surface.

The separating layer 19, which is thus pot-shaped as a whole and which is preferably integrally molded with the collar 32, can, and as is illustrated, be mounted in the region of the radial widening 31 as a result of a threaded engagement with the cylinder part 30.

Facing the drive device part 2, the separating layer 19 extending on the inner side of the wall of the cylinder part 30, supports a base 33, which extends transversely to the axis x in the hydraulic cylinder 13, having a thickness viewed in the axial direction, which can correspond to a multiple, for example 4 times to 6 times the thickness of the separating layer 19 on the inner side of the wall of the cylinder part 30.

Centrally passed through by the axis x, the base 33 is provided with an opening 34, which forms a part of the hydraulic line.

The lower surface of the base 33 facing the hydraulic cylinder base 35 can be spaced apart from the hydraulic cylinder base 35 in the axial direction, for instance with 0.5 times to 0.75 times the level of thickness of the base 33, viewed in the same direction. A direct contact is also possible in this respect.

The surface area of the base 33 facing away from the hydraulic cylinder base 35 serves as stop for the hydraulic piston 12, in particular the piston head 36 thereof, whereby, in the initial position illustrated in FIG. 7, in which the hydraulic piston 12 is maximally displaced in the direction of the drive device part 2, a clearance measurement a between the lower surface of the piston head 36, which is not electrically insulated by means of a separating layer or the like, is not maintained in the region of the base opening 34 and the next electrically conductive region of the drive device part 2—here of the hydraulic cylinder base 35, which minimum distance dimension a is preferably at least 10 to 12 mm, more preferably optionally approximately 15 mm. A necessary distance dimension between an electrically conductive region of the drive device part 2 and an optionally live section of the working head 4 is thus provided. A sufficient flashover resistance thus results.

For the arrangement of the working head 4 on the drive device part 2, the head-side cylinder part 29 is in screw-connection with the separating layer 19 in the region of the section 44 thereof. In the assigned position, optionally so as to limit abutment, the annular front face of the cylinder part 29, which faces the drive device part 2, moves against the section 44 of the separating layer 19, which lines the step-like widening of the cylinder part 30.

At least a distance dimension a of between 10 and 12 mm, preferably up to at least 15 mm, which ensures the flashover resistance, is also provided by the collar 32 between an optionally live section of the working head 4—for example the housing section 37 in FIG. 7—and the next possible electrically conductive section of the drive device part 2—here the radial widening 31.

According to the illustrations in FIGS. 4, 8, and 9, the hydraulic piston 12, in particular the piston head 36 thereof, which cooperates with the hydraulic medium 15, can consist of an electrically insulating material, for example of ceramic, as a further example of a pressure-resistant plastic.

According to the illustration in FIG. 8, the hydraulic cylinder 13, in particular the corresponding cylinder wall, and more preferably also the hydraulic cylinder base 35, can further consist directly of an electrically insulating material. A material reinforcement, which is overmolded with plastic, for example, can hereby be provided, for example in the region of the hydraulic cylinder wall 38. In contrast, the hydraulic cylinder wall 38 alone can also be formed from a pressure-resistant plastic, such as, for example, GRP or carbon fiber-reinforced plastic, for example in the case of low-pressure systems.

The hydraulic cylinder base 35 is provided with a central bore for forming a section of the hydraulic line 16. The thickness of the hydraulic cylinder base 35, viewed in the axial direction, preferably corresponds at least to the necessary distance dimension a of between 10 and 12, more preferably approximately 15 mm, further in particular in those cases, in which the piston head 36 is made of an electrically conductive, in particular metallic material.

In the case of this embodiment, an electrically insulating radial collar 20 is also provided, which, in the embodiment with a sleeve-like section 39, is attached on the outer side of the wall to the tubular cylinder wall of the hydraulic cylinder 13, which likewise consists of electrically non-conductive material. In the alternative, however, this can also be an integral embodiment in this respect.

In the radial direction, the radial collar 20 preferably extends beyond the radial dimension of the working head 4 into a region within the necessary distance a to the radial collar 20, so that a flashover from the preferably metallic housing section 37 of the working head 4 to the metallic housing of the drive device part 2 is also prevented.

In a further embodiment, the illustrations in FIGS. 11 to 17 show a seal 51, when arranging a separating layer 19 between the hydraulic cylinder 13 and the drive device part 2, as well as a relief valve 52 in the joining region 53 of the hydraulic cylinder 13. The resulting assembly A serves in particular for sealing an intermediate space 69 between two parts T1 and T2, here between the separating layer 19 (part T1) and the fixed part wall 22 or the hydraulic cylinder 13 (part T2), respectively.

The seal 51 can, and preferably, be formed thereby by an annularly continuous sealing element 54, for example in the form of an O-ring. In addition, this sealing element 54 can be aligned concentrically to the axis x.

Figure 11:
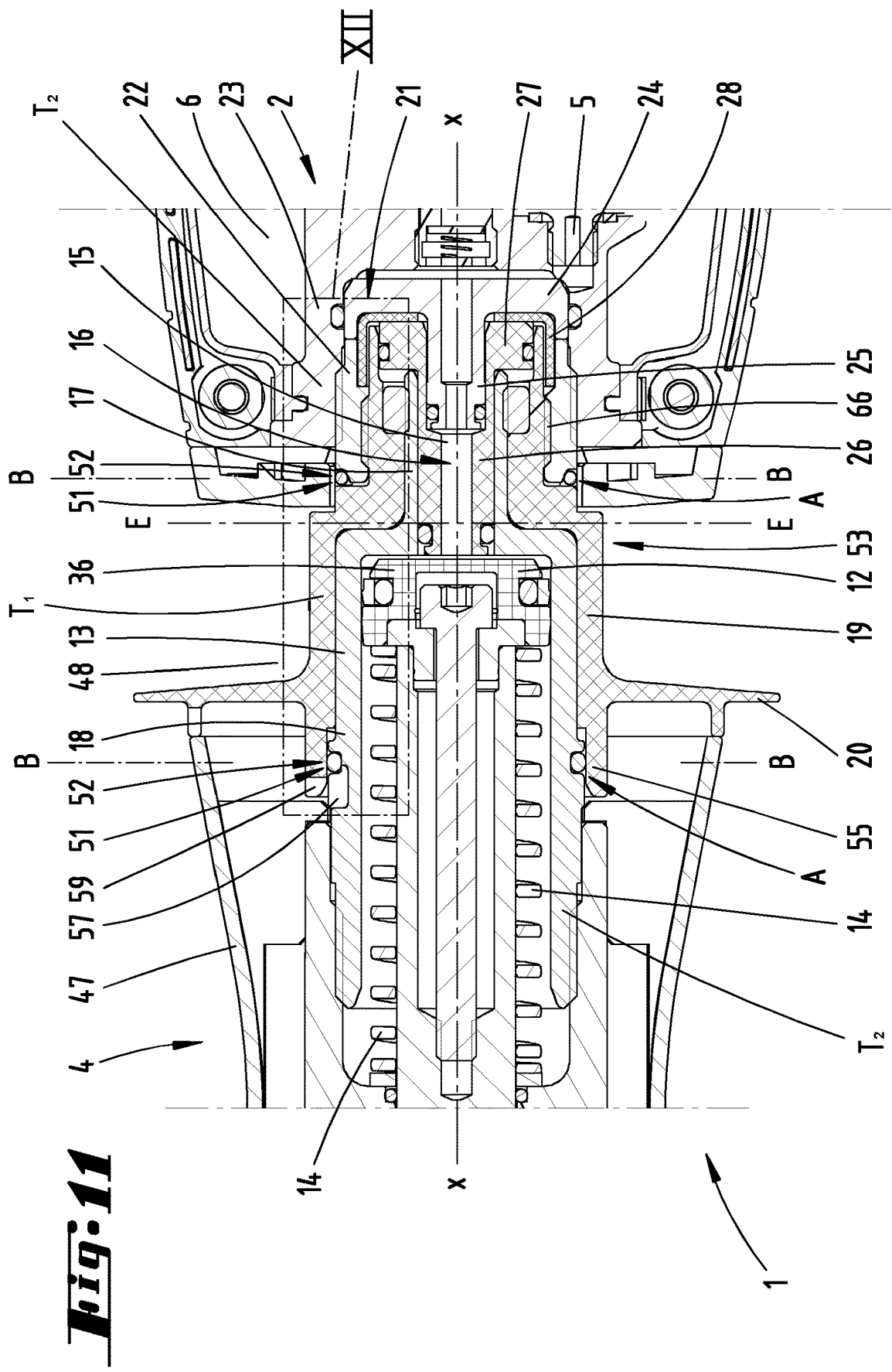
FIG. 11 shows a sectional illustration essentially corresponding to FIG. 9, relating to a further embodiment.

As can further be seen in particular from the illustration in FIG. 11, two sealing elements 54 of this type can be provided in concentrical position, but spaced apart from one another in the axial direction, wherein a first sealing element 54 can be positioned between the separating layer 19 and the fixed part 21, in particular the fixed part wall 22, and the further sealing element 54' can essentially be provided between the outer wall of the hydraulic cylinder 13 and the inner wall of the separating layer 19, which encompasses this region of the hydraulic cylinder 13.

Seals 51 and relief valves 52 can thus be provided in two regions, wherein in a possible, in addition also preferred embodiment, the sealing element 54 or 54', respectively, of the seal 51 can simultaneously also be used to form the relief valve 52, wherein the sealing element 54 or 54', respectively, rests in its respective sealing seat in a common initial position under pre-loading. Each sealing element 54 and 54' thereby spans a geometric plane B, which runs transversely to the axis x.

As is also partially embodied in the above-described exemplary embodiments, the separating layer 19 can encompass the end of the hydraulic cylinder 13, which encompasses the working head 4 in a pot-like manner. The radial collar 20 can thereby be molded on the outer side, wherein the pot wall 55 of the separating layer 19 can extend beyond the plane of the radial collar 20 in the direction of the working head 4 (see also FIG. 11).

In the illustrated exemplary embodiment, the sealing element 54' is assigned to this pot end of the separating layer 19, which preferably extends within the wall section 47. This sealing element 54' can be encompassed by this section of the pot wall 55 of the separating layer 19 preferably over the entire circumference, wherein the sealing element 54' can further rest in a groove 56 of the wall 18 of the hydraulic cylinder 13, which is concentrically circumferential to the axis x.

With respect to its cross section according to FIG. 11, the groove 56 can initially and essentially be designed in such a way that the sealing element 54' can be supported radially to the inside on the groove base 56, and in each case axially to the outside on the groove walls. Radially to the outside, the sealing element 54' can seal against the facing inner surface of the pot wall 55 of the separating layer 19.

Figure 12:
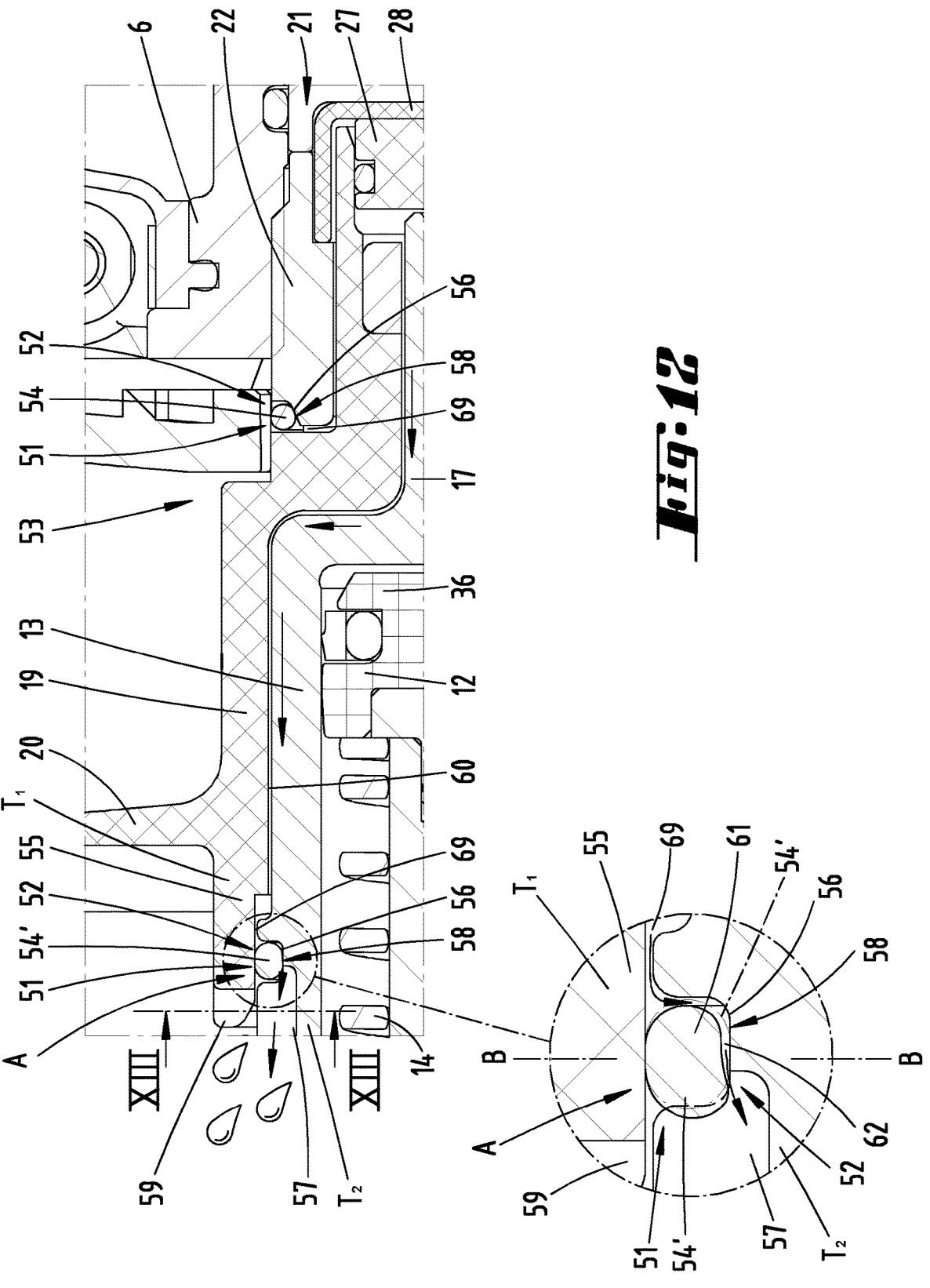
FIG. 12 shows the enlargement of the region XII in FIG. 11, in addition to a corresponding magnified illustration.
Figure 13:
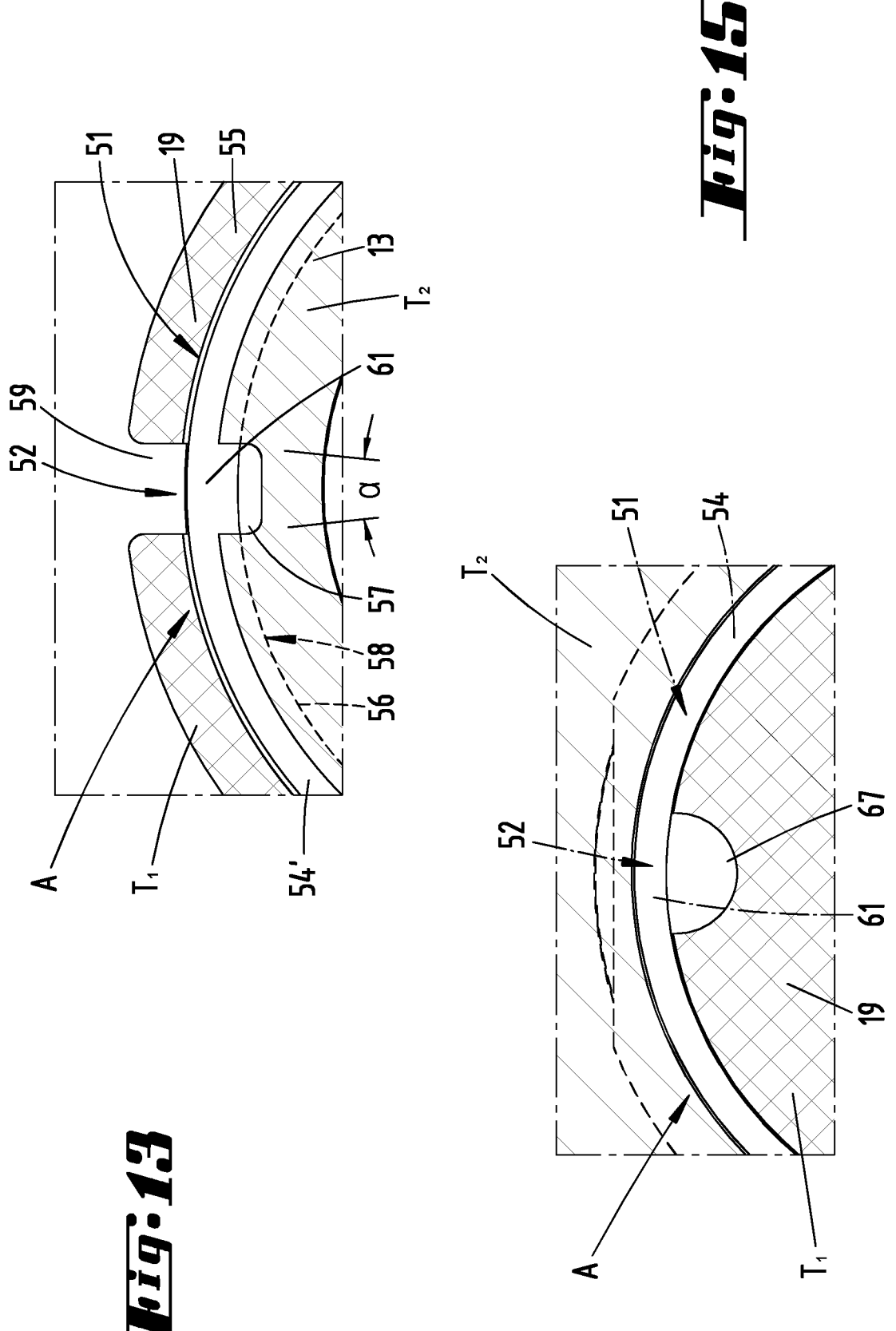
FIG. 13 shows the enlarged section according to the line XIII-XIII in FIG. 12.

As can in particular be seen from the enlarged illustrations in FIGS. 12 and 13, a recess 57 results, viewed over the circumference, which is formed to be limited in the circumferential direction the wall 18 of the hydraulic cylinder 13 and which has a larger radial depth compared to the groove 56 and the sealing seat 58 formed by the groove 56. Viewed in the axial direction, this recess 57 can extend, adjoining the sealing seat 58 and running into the latter, in the direction of the working head 4. Due to the formation of this recess 57, the contact surface for the sealing element 54' is interrupted on the side of the hydraulic cylinder 13.

As can be seen, for example, from FIG. 13, the recess 57 can extend over an angle α of, for example 5 to 20 degrees, as a further example 10 to 15 degrees, in the circumferential direction. In this recess region, the surface area of the sealing element 54', which faces away from the hydraulic line 16, is essentially exposed, can thus optionally yield elastically from the inside to the outside into the space of the recess 57 with this partial region 61 in response to a pressure load acting on the sealing element 54 (see also enlarged illustration in FIG. 12).

In the radial assignment to the recess 57, the free end region of the pot wall 55 of the separating layer 19 can additionally have an open-edged cutout 59 (see also FIG. 13 here).

According to the proposed embodiment, hydraulic medium between the outer wall of the hydraulic cylinder 13 and the inner wall of the pot-like separating layer 19 can reach in the direction of the axially front end of the separating layer 19 in response to an excessive hydraulic pressure, which optionally builds up in the device. For this purpose, a path 60, for example in the form of a groove-like depression, can be predetermined, for example on the outer side of the wall of the hydraulic cylinder 13, which path 60 leads to the partial region 61 of the sealing element 54' assigned to the recess 57. The hydraulic medium, which pushes against the sealing element 54' from the inside to the outside in this case, can lead to a movement of the corresponding partial region 61 of the sealing element 54 in the direction of the recess 57 and thus essentially perpendicular to the geometric plane B of the sealing element 54' in the region of the recess 57 when exceeding a predetermined pressure value, so that, according to the enlarged illustration in FIG. 12, a discharge path 62 past the partial region 61 can result. An incremental discharge of hydraulic fluid can thus be attained via the relief valve 52, which is designed in this way.

With the reduction of the pressure via the hydraulic medium, the sealing element 54' automatically restores due to the provided elasticity and pre-load of the sealing element 54', for sealingly resting in the sealing seat 58.

A loading of the sealing element 54' from the outside, for example in response to a loading from the outside by means of water or the like, the sealing element 54 is pressed into the sealing seat 58 to form a seal 51, so that such a loading optionally still supports the effect of the seal 51.

According to the illustrated exemplary embodiment, the further sealing element 54 can be received in a sealing seat 58 formed on the front face of the fixed part wall 22. This sealing seat 58 can be formed in the form of a groove 56, which is both axially and radially open, wherein, in a cross section according to, for example, FIG. 14, in which cross section the axis x presents itself as a line, the groove base 63 can be formed here as sloping inclined surface 70.

In the unloaded state, the sealing element 54, which rests in the sealing seat 58 designed in this way, can preferably seal against a facing front face 64 of the pot-shaped separating layer 19 as well as in particular against the groove base 63 and a rearward groove wall.

With respect to a hydraulic medium discharge when exceeding a hydraulic medium pressure, a discharge path 65 can result essentially between the fixed part 21 or the fixed part wall 22, respectively, and the wall of the separating layer 19 encompassed by the fixed part wall 22, wherein, as can in particular be seen from FIG. 17, a notch 67, which interrupts a circumferential thread 66 of the separating layer 19 in the axial direction, can further be provided on the outer side of the wall of the separating layer in order to define the discharge path 65.

Figure 14:
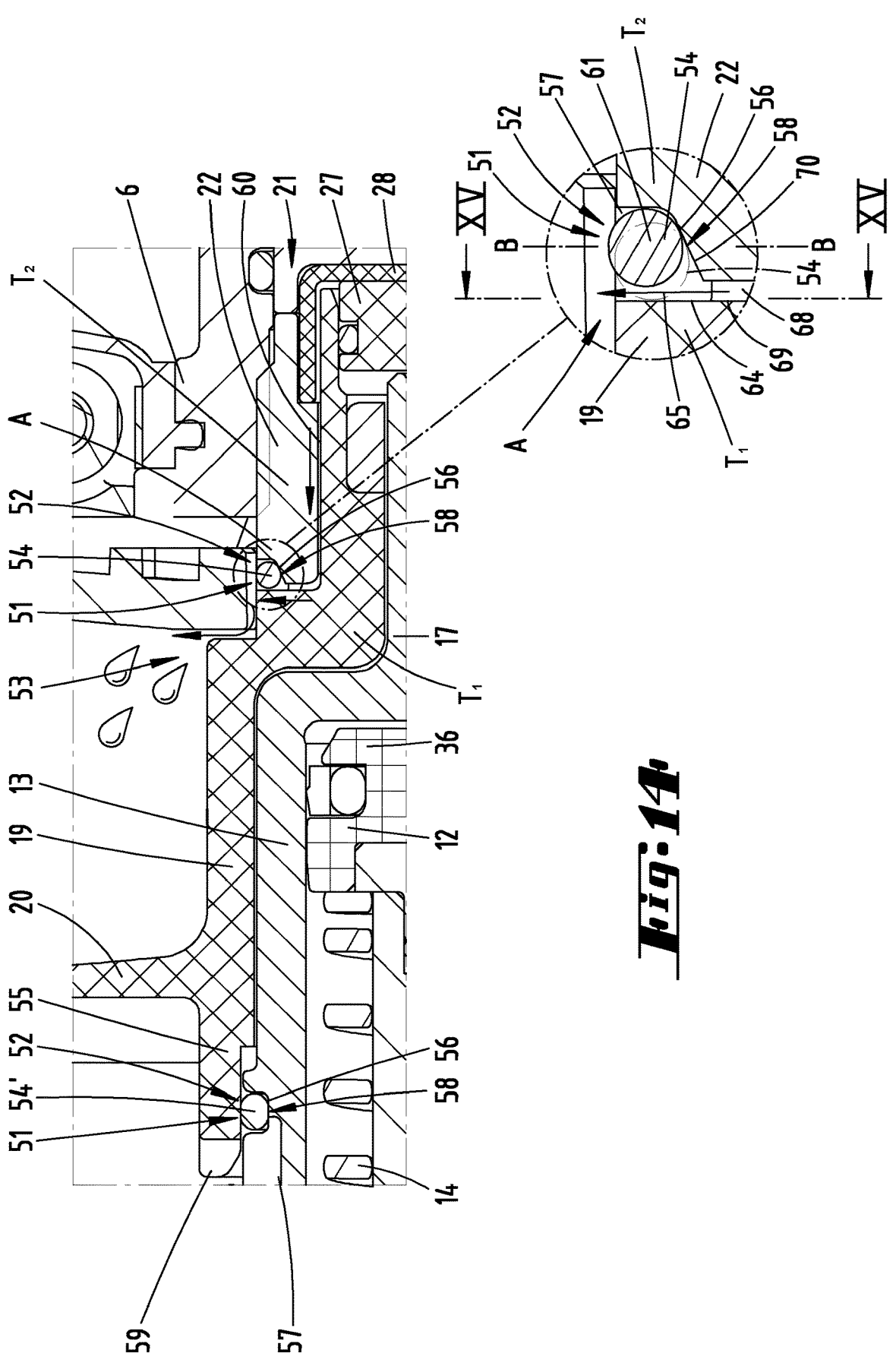
FIG. 14 shows a sectional illustration according to FIG. 12, in addition to a corresponding magnified illustration.

Assigned to the front face 64 of the separating layer 19, this notch 67 can additionally transition into a radial recess 68, which can result in a recess-like clearance for a partial region 61 of the sealing element 54 in the use position (see in particular FIGS. 14 and 15). The contact surface at one of the parts T1 or T2, respectively, here the separating layer 19, can also be interrupted accordingly in the circumferential direction here.

In response to a provided overpressure of the hydraulic medium 15, a discharge of hydraulic medium 15, in particular an incremental discharge of hydraulic medium 15, is also made possible from the inside to the outside in this region by opening the relief valve 52. Under elastic deformation of the partial region 61, the partial region 61 of the sealing element 54 can thereby be pushed by the sealing seat against the front face 64 of the separating layer 19, and can be displaced against the rising groove base 63 along the inclined surface 70 essentially in the axial direction, more preferably in the plane B to the outside and overlapped thereto perpendicular to the plane B, whereby the discharge path 65 can essentially open radially to the outside.

With pressure drop, the partial region 61 of the sealing element 54 can automatically move back into the sealing position, wherein an ingress of, for example, water, from the outside to the inside is counteracted in this position. A pressure acting from the outside in particular on the partial region 61 of the sealing element 54 can have a seal-intensifying effect due to the inclined alignment of the groove base 63.

Figure 19:
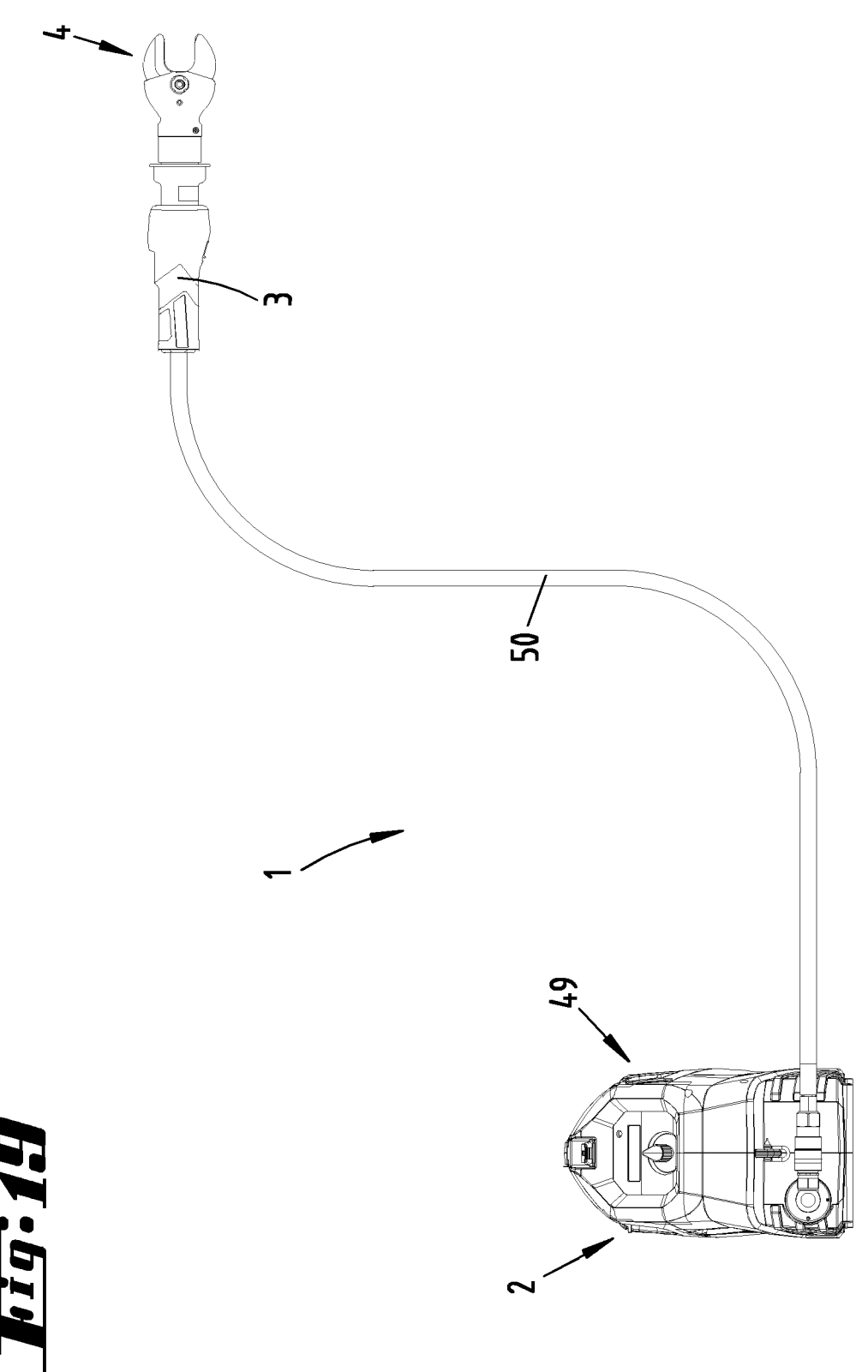
FIG. 19 shows a working device in a further embodiment.

According to the exemplary embodiment of the illustration in FIG. 19, a separate drive unit 49 can also be provided, by means of which hydraulic pressure can be generated in this exemplary embodiment, and hydraulic medium can be guided through a connected hydraulic hose 50 to the working head 4, which is connected to the other end of the hydraulic hose 50 in this embodiment. As do the above-described exemplary embodiments, this working head 4 has a hydraulic piston 12 and a hydraulic cylinder 13. In this respect, the working head 4 corresponds to the above-described working heads, further in particular with respect to the electrically insulated formation in the insulation plane E. The work process also applies here in the same way.

In addition, in particular assigned to the working head 4, the hydraulic hose 50 essentially forms the hydraulic line 16. The hydraulic hose 50 as a whole can have an electrically insulated casing hereby, or the hose jacket as a whole is formed in an electrically insulating manner, respectively.

Even only in a working head-side end region, assigned to the connection to the hydraulic cylinder 13 on the wall side, the hydraulic hose 50, however, can also consist of an electrically insulating material, over a length, which ensures an optionally required flashover resistance of at least 10 kV/cm.

Figure 10:
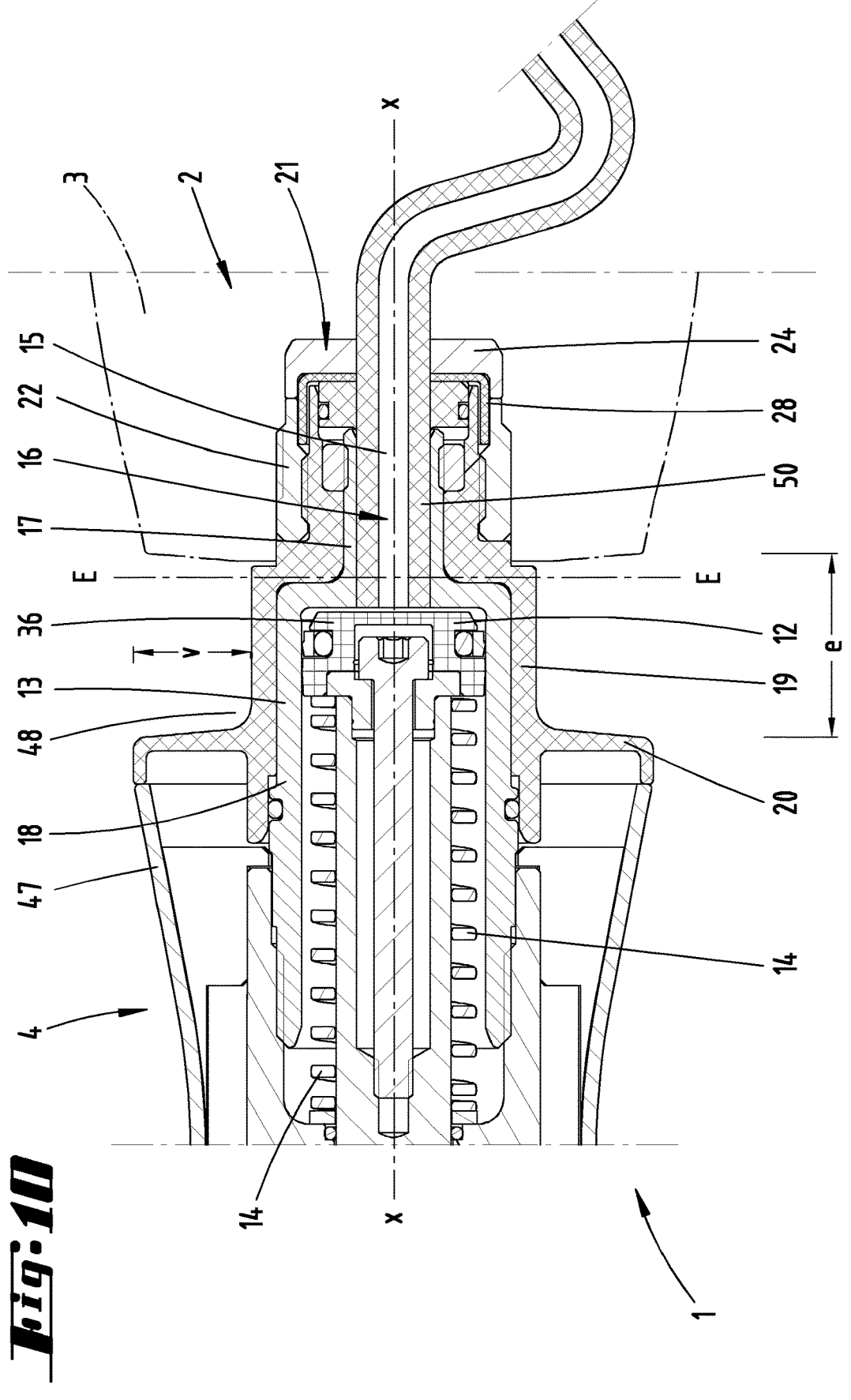
FIG. 10 shows an illustration corresponding to FIG. 4, relating to an alternative embodiment.

As suggested in FIG. 10, a hydraulic hose 50 of this type can also be part of an exclusively handheld, compact working device 1, for example according to FIG. 1, for the formation of the hydraulic line 16 between the hydraulic medium pump 8 in the handle region 3 and the hydraulic cylinder 13.

The hydraulic hose 50 can be connected directly to the working head-side hydraulic cylinder 13, wherein the corresponding end of the hydraulic hose 50 can be guided through the separating layer 19 according to the hydraulic line sections of the above-described embodiments. According to the above-described hydraulic line section, the insulated hose section can thus contribute to the formation of the insulation plane E (see, for example, FIG. 10).

The hydraulic hose 50 can also be connected to a hydraulic line section, which is provided in the working head 4 and which is preferably embodied in an electrically insulated manner on the wall side.

Figure 20:
FIG. 20 shows a manual working device having a sensor for detecting an electric voltage and a radio connection to a receiver.

In schematic illustration, FIG. 20 shows a working device 1, in particular a manual working device, more preferably a hydraulically actuated working device, as it is described on the basis of FIGS. 1 to 19, having a sensor 40 for detecting an electrical voltage S.

The sensor 40 can be arranged in the working region, for example in the region of the working head 4, preferably for the contact-free detection of a voltage, in particular high voltage, in a region around the working head 4. For example, a detection can thereby already take place at a distance of a few centimeters, up to, for example, 50 or 100 cm, optionally also beyond that.

The working device 1 can be provided with a light signal 41, in the alternative to or in combination therewith also with a sound signal, which signal notifies the user that a voltage S was detected by the sensor 40 in the immediate working region, in particular in the region of the working head 4. In the case of a working device 1, in which in particular the working head 4 is electrically insulated from the drive device part 2, for example according to the above-described embodiments, the work can be performed under voltage. The light signal 41 is to notify the user only of the actual state in this case.

In the case of manual working devices, which do not have an electrical insulation, in particular no insulation, which is sufficient for the high-voltage range, the signal 41 can lead to the cancellation of the work, which is to be performed.

The sensor 40 on the device side is in contact with a transmitter 42. The latter can be arranged directly in the working device 1.

A radio connection F can be established via the transmitter 42, for example via Bluetooth or WLAN, optionally via a mobile radio network.

The radio connection F makes it possible for the working device 1 to transmit a corresponding detection of a voltage S to a receiver 43. This receiver 43 is provided outside of the working device 1, it can be, for example, a central data processing device or, for example, a notebook or the like, or also a further working device 1, as illustrated. For example, the detection of voltage S can thus further be transferred within a certain working region as warning to further working devices 1 or to the users operating these further working devices 1, respectively.

| List of Reference Numerals | | | |
|---|---|---|---|
| 1 | working device | 28 | element |
| 2 | drive device part | 29 | cylinder part |
| 3 | handle region | 30 | cylinder part |
| 4 | working head | 31 | radial widening |

-continued

| List of Reference Numerals | | | |
|---|---|---|---|
| 5 | return valve | 32 | collar |
| 6 | tank | 33 | base |
| 7 | pump tappet | 34 | opening |
| 8 | hydraulic medium pump | 35 | hydraulic cylinder base |
| 9 | electric motor | 36 | piston head |
| 10 | accumulator | 37 | housing section |
| 11 | actuating button | 38 | hydraulic cylinder wall |
| 12 | hydraulic piston | 39 | section |
| 13 | hydraulic cylinder | 40 | sensor |
| 14 | restoring spring | 41 | light signal |
| 15 | hydraulic medium | 42 | transmitter |
| 16 | hydraulic line | 43 | receiver |
| 17 | neck | 44 | section |
| 18 | wall | 45 | cutting jaw |
| 19 | separating layer | 46 | pressing jaw |
| 20 | radial collar | 47 | wall section |
| 21 | fixed part | 48 | tapering region |
| 22 | fixed part wall | 49 | drive unit |
| 23 | receptacle | 50 | hydraulic hose |
| 24 | continuing part | 51 | seal |
| 25 | metallic section | 52 | relief valve |
| 26 | lining part | 53 | joining region |
| 27 | radial widening | 54 | sealing element |
| 54' | sealing element | a | distance dimension |
| 55 | pot wall | e | level of extension |
| 56 | groove | v | level of protrusion |
| 57 | recess | x | axis |
| 58 | sealing seat | A | assembly |
| 59 | cutout | B | plane |
| 60 | path | E | insulation plane |
| 61 | partial region | F | radio connection |
| 62 | discharge path | S | voltage |
| 63 | groove base | $T_1$ | part |
| 64 | front face | $T_2$ | part |
| 65 | discharge path | α | angle |
| 66 | thread | | |
| 67 | notch | | |
| 68 | radial recess | | |
| 69 | intermediate space | | |
| 70 | inclined surface | | |

The invention claimed is:

1. A hydraulically actuated working device comprising:
a hydraulic cylinder defining a longitudinal axis;
a hydraulic piston configured to be displaced along the longitudinal axis in the hydraulic cylinder;
a drive device part forming a handle region, the drive device part including a motor and a pump, the handle region having an outer surface which is configured to be gripped by an operator's hand;
a hydraulic line leading to the hydraulic cylinder;
a working head coupled to the hydraulic piston;
a trench having an elongated wall extending between first and second longitudinal ends, the first longitudinal end of the trench being defined by the drive device part; and
a collar between the working head and the trench, the collar extending outward in a radial direction relative to the longitudinal axis thereby forming an outer surface of the collar, the collar extending circumferentially around the longitudinal axis and being uninterrupted, and wherein the collar is formed of an electrically non-conductive material,
the second longitudinal end of the trench being defined by the collar, the trench extending circumferentially around the longitudinal axis and being uninterrupted,
wherein a radial level of extension of the handle region is defined in the radial direction between the longitudinal axis and the outer surface of the handle region, a radial level of extension of the trench is defined in the radial direction between the longitudinal axis and the elongated wall of the trench, and a radial level of extension of the collar is defined in the radial direction between the longitudinal axis and the outer surface of the collar, and wherein the radial level of extension of the trench is smaller than the radial level of extension of the handle region and is smaller than the radial level of extension of the collar.

2. The hydraulically actuated working device of claim 1, wherein the collar is plate-like.

3. The hydraulically actuated working device of claim 1, wherein an axial level of extension of the trench is defined between the first and second longitudinal ends thereof and is between 8 mm and 30 mm.

4. The hydraulically actuated working device of claim 1, wherein an axial level of extension of the trench is defined between the first and second longitudinal ends thereof and is at least 8 mm.

5. The hydraulically actuated working device of claim 1, wherein the radial level of extension of the collar is 8 mm or more.

6. The hydraulically actuated working device of claim 1, wherein the radial level of extension of the collar is between 8 mm and 20 mm.

7. The hydraulically actuated working device of claim 1, wherein the collar extends radially outward from the hydraulic cylinder.

8. The hydraulically actuated working device of claim 7, further comprising an electrically insulating separating layer surrounding the hydraulic cylinder, and the collar extending from the electrically insulating separating layer.

9. The hydraulically actuated working device of claim 7, wherein the collar is integrally formed with the hydraulic cylinder.

10. The hydraulically actuated working device of claim 1, wherein the working head has an electrically insulated wall section proximate to the collar and which extends from an outer end of the collar.

11. The hydraulically actuated working device of claim 10, wherein the radial level of extension of the collar is 8 mm or more.

12. The hydraulically actuated working device of claim 10, further comprising an electrically insulating separating layer surrounding the hydraulic cylinder, the electrically insulating separating layer being inside the wall section, and the collar extends from the electrically insulating separating layer.

13. The hydraulically actuated working device of claim 1, wherein the drive device part has an electrically conductive wall section proximate to the collar and which extends from an outer end of the collar.

14. The hydraulically actuated working device of claim 13, wherein the radial level of extension of the collar is 8 mm or more.

15. The hydraulically actuated working device of claim 1, wherein the drive device part has an electrically conductive wall section extending from the collar proximate to, but spaced from, an outer end thereof, and further including an electrically insulating separating layer extending from the collar and between the hydraulic cylinder and the wall section.

16. The hydraulically actuated working device of claim 15, wherein the radial level of extension of the collar is between 8 mm and 20 mm.

17. The hydraulically actuated working device of claim 1, wherein the radial level of extension of the collar is between 8 mm and 20 mm.

18. A hydraulically actuated working device comprising:
a hydraulic cylinder defining a longitudinal axis;
a hydraulic piston configured to be displaced along the longitudinal axis in the hydraulic cylinder;
a drive device part forming a handle region, the drive device part including a motor and a pump;
a hydraulic line leading to the hydraulic cylinder;
a working head coupled to the hydraulic piston; and
a collar separating the handle region from the working head and extending radially outward to define a radial level of extension, the collar extending circumferentially around the longitudinal axis and being uninterrupted, and wherein the collar is formed of an electrically non-conductive material;
an electrically insulating separating layer extending from the collar, and
wherein the drive device part has an electrically conductive wall section extending from the collar proximate to, but spaced from, an outer end thereof, and the electrically insulating separating layer is between the hydraulic cylinder and the wall section, and
wherein the collar extends radially outward from the wall section.

19. The hydraulically actuated working device of claim 18, wherein the radial level of extension of the collar is between 8 mm and 20 mm.

20. A hydraulically actuated working device comprising:
a hydraulic cylinder defining a longitudinal axis;
a hydraulic piston configured to be displaced along the longitudinal axis in the hydraulic cylinder;
a drive device part forming a handle region having an outer surface which is configured to be gripped by an operator's hand, wherein a radial level of extension of the handle region is defined in a radial direction between the longitudinal axis and the outer surface of the handle region, the drive device part including a motor and a pump;
a hydraulic line leading to the hydraulic cylinder;
a working head coupled to the hydraulic piston; and
a collar separating the handle region from the working head, the collar extending outward in the radial direction relative to the longitudinal axis thereby forming an outer surface of the collar, the collar being immediately adjacent to the handle region in the direction of the longitudinal axis such that the collar limits the handle region in the direction of the longitudinal axis on one side and the working head in the direction of the longitudinal axis on the other side, the collar extending circumferentially around the longitudinal axis and being uninterrupted, and wherein the collar is formed of an electrically non-conductive material,
wherein a radial level of extension of the handle region is defined in the radial direction between the longitudinal axis and the outer surface of the handle region, and a radial level of extension of the collar is defined in the radial direction between the longitudinal axis and the outer surface of the collar, and
wherein the radial level of extension of the handle region is smaller than the radial level of extension of the collar.

21. The hydraulically actuated working device of claim 20, wherein the radial level of extension of the collar is 8 mm or more.

* * * * *